United States Patent
Chan

(10) Patent No.: US 11,209,218 B2
(45) Date of Patent: Dec. 28, 2021

(54) FLUID HEAT EXCHANGER AND ENERGY RECYCLING DEVICE

(71) Applicant: Hong Kong Modern Technology Limited, Kowloon (HK)

(72) Inventor: Sai-Fai Chan, Kowloon (HK)

(73) Assignee: Hong Kong Modern Technology Limited, Kowloon (HK)

( * ) Notice: Subject to any disclaimer, the term of this patent is extended or adjusted under 35 U.S.C. 154(b) by 18 days.

(21) Appl. No.: 16/712,246

(22) Filed: Dec. 12, 2019

(65) Prior Publication Data

US 2020/0116439 A1  Apr. 16, 2020

Related U.S. Application Data

(62) Division of application No. 15/024,906, filed as application No. PCT/CN2014/088013 on Sep. 30, 2014, now abandoned.

(30) Foreign Application Priority Data

Sep. 30, 2013 (HK) .................... 13111142.9

(51) Int. Cl.
| | |
|---|---|
| F28D 21/00 | (2006.01) |
| F28F 13/12 | (2006.01) |
| F28D 7/10 | (2006.01) |
| E03C 1/00 | (2006.01) |
| F28F 9/02 | (2006.01) |
| F28F 13/02 | (2006.01) |

(52) U.S. Cl.
CPC ......... *F28D 21/0012* (2013.01); *F28D 7/106* (2013.01); *F28F 13/12* (2013.01); *E03C 2001/005* (2013.01); *F28F 9/0275* (2013.01); *F28F 13/02* (2013.01); *Y02B 30/56* (2013.01)

(58) Field of Classification Search
CPC . F28D 7/106; F28F 13/12; F28F 13/02; F28F 9/0275
See application file for complete search history.

(56) References Cited

U.S. PATENT DOCUMENTS

| 1,607,171 A | * | 11/1926 | Sage | ......................... | F28F 1/32 |
| | | | | | 165/130 |
| 2,060,936 A | | 11/1936 | Haag, Jr. | | |

(Continued)

FOREIGN PATENT DOCUMENTS

| CN | 2625833 Y | 7/2004 |
| JP | 2000046251 A | 2/2000 |

(Continued)

*Primary Examiner* — Frantz F Jules
*Assistant Examiner* — Lionel Nouketcha
(74) *Attorney, Agent, or Firm* — Barlow, Josephs & Holmes, Ltd.; Stephen J. Holmes

(57) ABSTRACT

The present invention relates to a heat exchanger, an energy recycling system, a fluid distribution manifold and a baffle. The heat exchanger comprising: a first fluid tube through which a first fluid of a first temperature flows; a second fluid tube through which a second fluid of a second temperature flows; a baffle located in at least one of said tubes for moderating flow of at least one fluid passing therethrough; wherein the heat exchanger is configured for communicating thermal energy between the first fluid and the second fluid.

19 Claims, 38 Drawing Sheets

(56) References Cited

U.S. PATENT DOCUMENTS

| | | | | |
|---|---|---|---|---|
| 2,301,433 A | * | 11/1942 | Mcelgin | F28F 1/32 |
| | | | | 165/71 |
| 3,504,739 A | * | 4/1970 | Pearce | F28F 9/0229 |
| | | | | 165/134.1 |
| 4,163,474 A | | 8/1979 | MacDonald et al. | |
| 4,284,133 A | | 8/1981 | Gianni et al. | |
| 4,619,311 A | * | 10/1986 | Vasile | F24D 17/0057 |
| | | | | 165/47 |
| 5,497,824 A | * | 3/1996 | Rouf | F28F 13/12 |
| | | | | 138/38 |
| 5,915,472 A | | 6/1999 | Takikawa et al. | |
| 6,102,561 A | * | 8/2000 | King | B01F 5/0614 |
| | | | | 138/38 |
| 6,920,917 B2 | | 7/2005 | Inoue et al. | |
| 7,191,824 B2 | | 3/2007 | Wu et al. | |
| 8,051,902 B2 | * | 11/2011 | Kappes | F28F 9/0202 |
| | | | | 165/164 |
| 9,938,880 B2 | * | 4/2018 | Bruggesser | F28F 9/0075 |
| 2010/0288478 A1 | * | 11/2010 | Barron | B23K 1/008 |
| | | | | 165/173 |
| 2012/0186792 A1 | | 7/2012 | Seemes | |

FOREIGN PATENT DOCUMENTS

| | | |
|---|---|---|
| JP | 2012007771 A | 1/2012 |
| KR | 1020090033926 A | 4/2009 |
| WO | 2009060487 A1 | 5/2009 |

* cited by examiner

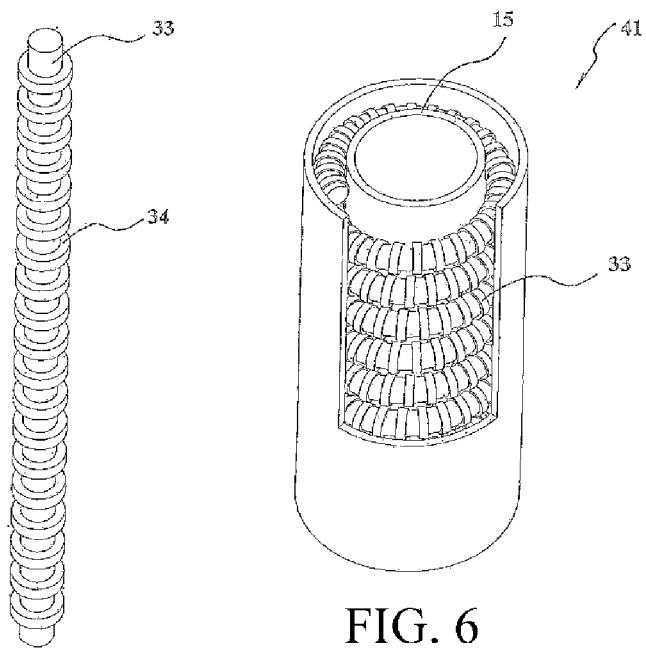
FIG. 5
FIG. 6
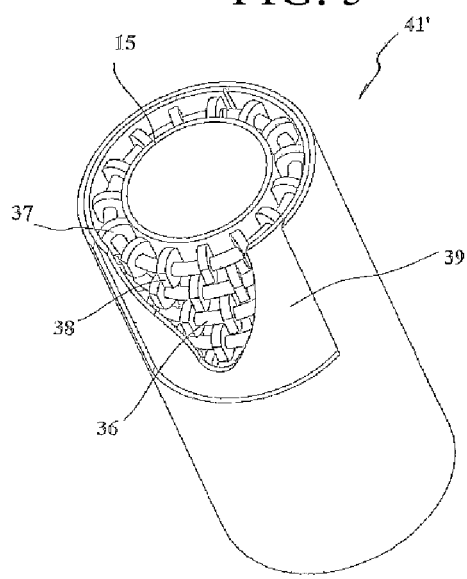
FIG. 7
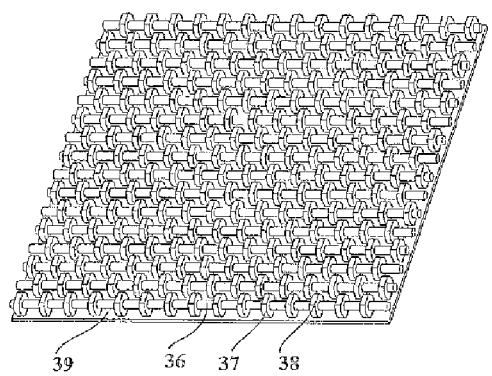
FIG. 8

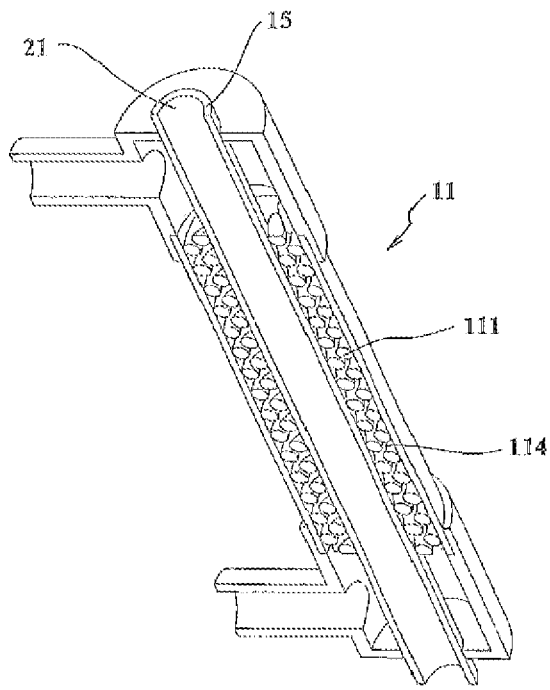
FIG. 23
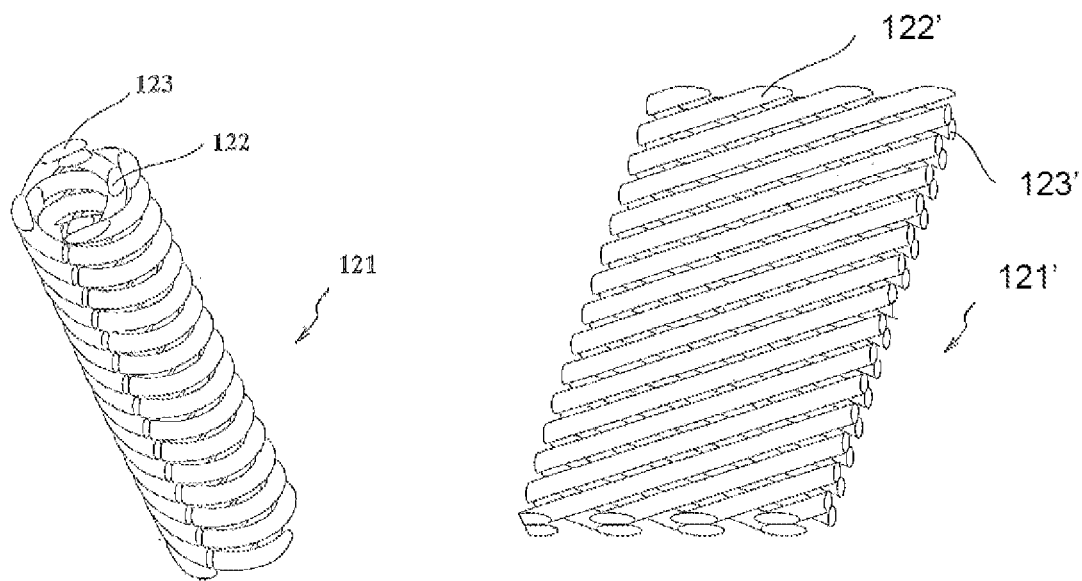
FIG. 24
FIG. 25

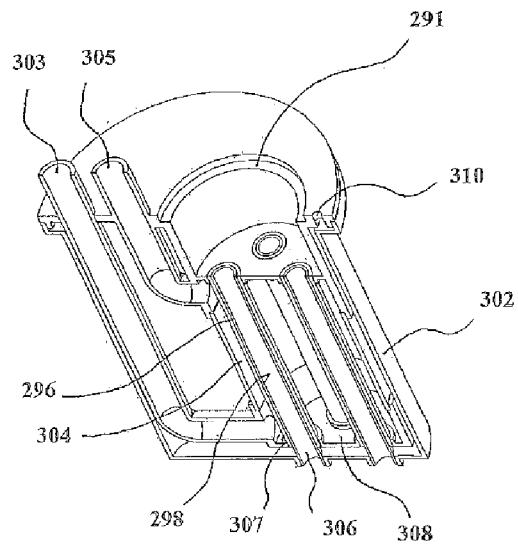
FIG. 72
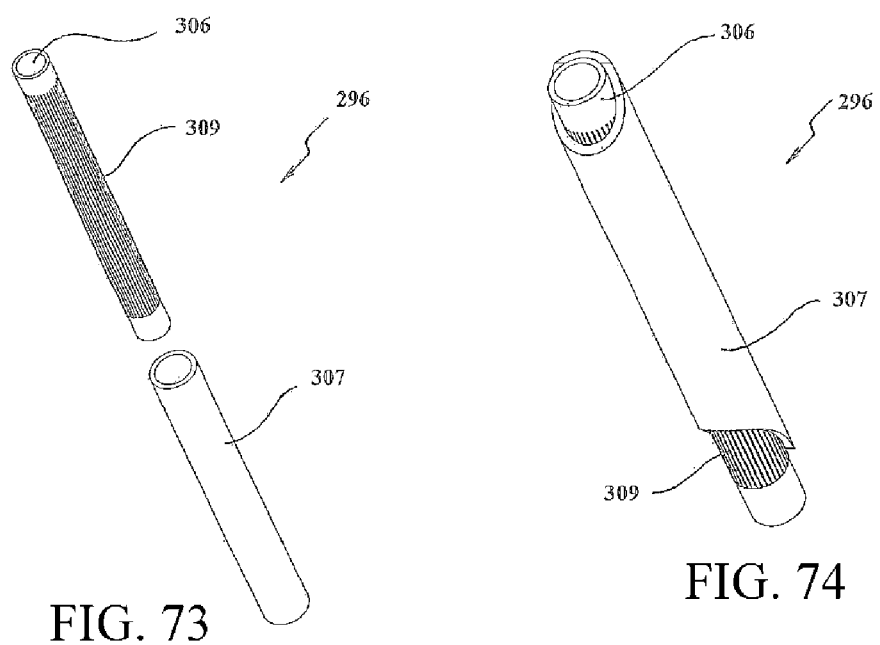
FIG. 73
FIG. 74

FLUID HEAT EXCHANGER AND ENERGY RECYCLING DEVICE

CROSS-REFERENCE TO RELATED APPLICATIONS

This application is a divisional application of U.S. application Ser. No. 15/024,906, filed Mar. 25, 2016, which is a Section 371 National Phase filing of PCT/CN2014/088013, filed Sep. 30, 2014.

FIELD OF THE INVENTION

The present invention relates to heat exchanging technology. In particular, the present invention relates to a heat exchanger, an energy recycling system, a fluid distribution manifold and a baffle.

BACKGROUND OF THE INVENTION

In everyday life, people may use different washing facilities for cleaning and washing. These facilities include, for example, bathroom showers, sinks, washing tanks and the like. However, if the washing facilities use hot water as a washing medium, such wastewater discharged by the facilities still contains a huge amount of heat, thereby resulting in a waste of energy.

All along, people have tried various methods to recover and utilize the energy lost in vain. For example, U.S. Pat. No. 4,619,311 discloses an "equal volume, contra flow heat exchanger", which provides a heat exchanger and an energy recovery device for improving heat energy recovery from hot wastewater. As shown in FIGS. 1 and 1A, a heat exchanger 430 includes an inner wastewater pipe 410 made of copper or aluminum with smooth inner walls and an outer pipe 412, the heat exchanger 430 is installed vertically, and the inner wastewater pipe 410 is connected to a drain pipe 429 of a bathtub or sink 460 or the like, so that hot wastewater 432 passes through the inner wastewater pipe 410 from the top down and drains into sewers, cold feed water 426 enters the heat exchanger 430 from a water inlet 417 through a cold water pipe 416 and flows out from a water outlet 419 as preheated water, and the preheated water flows into a water heater 420 through a pipeline 418 to be further heated for application or storage. As shown in FIG. 1A, the cold feed water 426 passes between the inner wastewater pipe 410 and the outer pipe 412 from the bottom up and forms a "cold water jacket" surrounding the inner wastewater pipe 410, and the cold feed water exchanges heat with hot wastewater reversely flowing in the inner wastewater pipe 410. As the inner diameter of the inner wastewater pipe 410 is greater than that of the drain pipe 429, the hot wastewater will not fill the cavity of the whole inner wastewater pipe 410 when passing through the inner wastewater pipe 410, which can be attached to the inner wall of the inner wastewater pipe 410 to form a thin film of the hot wastewater 432 to flow downwards spirally. The preheated water flowing out from the water outlet 419 may simultaneously flow into a mixing valve 434 through a pipeline 427, is mixed into tepid water with hot water from the water heater 420 through a pipeline 444, and flows out from a sprinkler 346 or a water tap 452 for use.

Although the heat exchanger and the energy recovery device have a simple structure and can reduce the amount of hot water use and heating energy consumption, the problem of low heat recovery efficiency still exists. As the "cold water jacket" 426 exchanges heat with the hot wastewater through a pipe wall of the inner wastewater pipe 410, due to resistance of the pipe wall, most of the cold water may quickly pass through a central portion between the inner wastewater pipe 410 and the outer pipe 412 at a higher speed without being fully heated, and with a laminar flow phenomenon of water flow, the cold water quickly passed through is not fully mixed with preheated water that has been heated adjacent to the pipe wall of the inner wastewater pipe 410, which causes low recovery efficiency.

The U.S. Pat. No. 4,619,311 is incorporated into the present invention by reference.

OBJECT OF THE INVENTION

Accordingly, it is an object of the present invention to overcome or at least partially alleviate at least some of the deficiencies associated with the prior art.

SUMMARY OF THE INVENTION

Broadly speaking, the present invention has described a fluid heat exchanger and an energy recovery device with high energy recovery efficiency, are simple to install, convenient to use and easy to clean.

According to a first broad form of the present invention, there is provided a heat exchanger comprising a first fluid tube through which a first fluid of a first temperature flows, a second fluid tube through which a second fluid of a second temperature flows, a baffle located in at least one of said tubes for moderating flow of at least one fluid passing therethrough, wherein the heat exchanger is configured for communicating thermal energy between the first fluid and the second fluid.

Preferably, the baffle may be configured to exchange thermal energy between the first and second fluid.

Advantageously, the first tube and second tube may be configured for exchange of thermal energy between the first and second fluid.

Preferably, the heat exchanger may further comprise a passage between the first fluid tube and the second fluid tube, the passage for receiving fluid leaking from the first fluid tube or the second fluid tube.

Advantageously, the baffle may be configured for moderating the flow of fluid through at least one of the fluid tubes, according to any one or more of the following configurations: at least one elongate member extending in a direction of radially or along at least one of the fluid tubes; at least one protrusion extending radially from a wall of at least one of the fluid tubes, wherein the protrusion is integrally formed or detachably mounted on the wall; at least one protrusion extending in a direction of along a wall of at least one of the fluid tubes, the protrusion being integrally formed or detachably mounted on the wall; at least one spiral guiding structure extending along at least one of the fluid tubes; and at least one sleeve extending along at least one of the tubes.

Preferably, the baffle may comprise at least one elongate member extending in a spiral arrangement, wherein the at least one elongate member extends in the direction of around or about at least one of the fluid tubes, or along the direction of the longitudinal axis of at least one of the fluid tubes.

Preferably, the baffle may comprises at least one elongate member, formed in one or more spiral elements which extend around the inner circumference of the fluid tubes or along the longitudinal axis of the fluid tubes for moderating the flow of fluid through at least one of the fluid tubes, and wherein the at least one elongate member extends in the direction of around or about at least one of the fluid tubes, or extends along the direction of the longitudinal axis of at least one of the fluid tubes.

Preferably, the at least one elongate member may extend about a core in an interengaged spiral arrangement, in a longitudinal direction along at least one of the fluid tubes.

Preferably, the baffle may comprise at least one elongate member extending in a direction of around or about at least one of the fluid tubes, or along the direction of the longitudinal axis of at least one of the fluid tubes, and said at least one elongate member includes annular or spiral protrusions thereon.

Preferably, the baffle may include at least one protrusion extending radially from a wall of at least one of the fluid tubes and wherein the at least one protrusion extends in a annular or spiral arrangement.

Preferably, the protrusions may extend in an annular or spiral arrangement along, about or within either or both of the fluid tubes.

Preferably, the protrusions may extend in a spiral arrangement include a plurality of spaces therebetween, the spaces being substantially aligned to create a turbulent flow with the spiral flow.

Advantageously, the heat exchanger may further comprise a plurality of elongate members having circumferential helical grooves formed therein, and both the elongate members and the grooves extend in a direction of along at least one of the fluid tubes.

Preferably, the baffle may include at least one spiral guiding structure extending along at least one of the fluid tubes, the spiral guiding structure formed by a plurality of members together define a spiral flow path.

Preferably, the spiral guiding structure may include a plurality of elements formed therein substantially aligned to create a turbulent flow with the spiral flow path.

Preferably, the baffle may include a sleeve which extends along at least one of the fluid tubes.

Preferably, the sleeve may extend along, about or within either or both of the fluid tubes and includes a plurality of holes therein.

Preferably, the sleeve may extend in interengaged spiral arrangements with a plurality of elongate members.

Preferably, the baffle may include at least a first and a further layer of elongate members, each of the layers comprising a plurality of elongate members each extending in a common direction, the common direction of the elongate members of the first layer being different from the common direction of the elongate members of the further layer. 20. A heat exchanger according to claim 19, wherein the elongate members of the first layer are configured so as to be in thermal communication with the wall of at least one of the fluid tubes.

Advantageously, the baffle may include a sleeve, extending along at least one of the fluid tubes and located between the first layer and the further layer.

Advantageously, the sleeve may include a plurality of holes therein.

Advantageously, at least one fluid tube may include a plurality of elongate members wrapped about a common longitudinal axis and along the at least one fluid tube, wherein the fluid tube has generally elliptical cross sectional profile formed by compression of a fluid tube having a generally circular cross sectional profile.

Advantageously, the baffle may include at least one disc disposed within at least one of the tubes and wherein the disc includes protrusions thereon which define a plurality of flow paths.

Advantageously, at least one of the fluid tubes of the heat exchanger may be configured for receiving a cleaning tube through an opening formed therein, the cleaning tube directing a fluid stream for displacing deposits formed within the heat exchanger.

Advantageously, a fluid distribution manifold may have at least one protrusion which is located proximate the inlet of at least one fluid tube of a corresponding heat exchanger, wherein the fluid distribution manifold further includes a vent therein.

Advantageously, the manifold may distribute fluid into fluid tubes of the heat exchanger via at least one or more passageways defined by the protrusion and manifold, wherein the vent is in communication with at least one of the protrusions.

Optionally, the air flow to the fluid may be spaced tube apart from the fluid flow by the vent.

Optionally, the protrusions of the manifold may be spaced apart from the inlet of at least one or more of the fluid tubes so as to direct the flow of air and fluid into the fluid tubes.

Optionally, the protrusions of the manifold may contact at least a portion of the inlet of at least one or more of the fluid tubes.

According to a second broad form of the present invention, there is provided an energy recycling system including a heat exchanger and a fluid distribution manifold.

Preferably, the baffle may be according to any baffle in the embodiment of the heat exchanger above.

According to a third broad form of the present invention, there is provided a kit for a heat exchanger including a first fluid tube through which a first fluid of a first temperature flows, a second fluid tube through which a second fluid of a second temperature flows, and a baffle for moderating the flow of fluid through at least one of the fluid tubes according to any embodiment of the heat exchanger above.

According to a fourth broad form of the present invention, there is provided a kit for a heat exchanger according to any embodiment above, and further including a cleaning tube according to any embodiment above, and/or a fluid distribution manifold according to any embodiment above.

In a further aspect of an embodiment of the present invention, there may be provided a kit for a heat exchanger including a first fluid tube through which a first fluid of a first temperature flows, a second fluid tube through which a second fluid of a second temperature flows, and a baffle for providing resistance to the flow of fluid through at least one of the fluid tubes according to the above.

In a further embodiment of the present invention there is provided a fluid heat exchanger, including: a first fluid collector having an opening, a cavity and a plurality of first fluid outlets, where the opening covers all the first fluid outlets, for introducing a first fluid into the cavity, and then exporting the first fluid out of the first fluid outlets in parallel; a housing having a second fluid inlet, a second fluid outlet and a second fluid cavity between the second fluid inlet and the second fluid outlet; and a plurality of metal pipes each placed in the second fluid cavity, and forming a plurality of first fluid channels through the second fluid cavity and the housing for the first fluid to pass through in parallel, the first fluid channels separately communicate with the first fluid outlets of the first fluid collector to receive the first fluid exported from the first fluid outlets, where the second fluid inlet is used for introducing a second fluid with a temperature different from that of the first fluid, which flows through the second fluid cavity, and exchanges heat with the first fluid passing through in parallel within the first fluid channels by means of the plurality of metal pipes to change the temperature of the second fluid and then exported from the second fluid outlet.

In a further embodiment of the present invention there is provided an energy recovery device, which includes the heat exchanger described above and an external means for changing the temperature of the second fluid discharged from the second fluid outlet to an appropriate temperature of use and making the second fluid serve as the first fluid entered the opening of the first fluid collector of the heat exchanger after use.

The heat exchanger, the energy recovery device and the energy recovery system according to the present invention can efficiently recover energy in fluids, are simple to install, convenient to use and easy to clean, which are suitable for use in showers or sinks or other facilities.

According to an illustrative embodiment of the present disclosure, a thermal conductive baffle disposed in a fluid channel, wherein the fluid channel is an annular channel formed by internal and external tubular surfaces mutually nested, at least one part of the two tubular surfaces is formed by metal, the baffle clings to the two tubular surfaces and maintains good thermal contact with the metal part of the tubular surfaces, fluids passing through the annular channel exchange heat with substances outside the annular channel by means of the baffle and the metal part of the tubular surfaces, the baffle is formed by one or more metal strips having protruding solid structures, and the centerline of the metal strip is configured to surround the internal tubular surface.

Optionally, a plurality of annular projections is spaced apart along a length direction of a surface of the metal strip.

Optionally, the metal strip is spiral spring-like.

Optionally, a spiral center of the spiral spring-like metal strip has another metal strip.

Optionally, the metal strip is formed by intertwining of a plurality of metal wires.

Optionally, the metal strip is a spiral strip having a non-circular cross-section.

Optionally, the centerline of the metal strip is parallel to the centerline of the internal tubular surface.

Optionally, the centerline of the metal strip spirally extends around the centerline of the internal tubular surface.

Optionally, the centerline of the metal strip vertically surrounds the centerline of the internal tubular surface.

According to another illustrative embodiment of the present disclosure, a baffle having a thermal conductive baffle disposed in a fluid channel, wherein the fluid channel is an annular channel formed by internal and external tubular surfaces mutually nested, at least one part of the two tubular surfaces is formed by metal, the baffle clings to the two tubular surfaces and maintains good thermal contact with the metal part of the tubular surfaces, fluids passing through the annular channel exchange heat with substances outside the annular channel by means of the baffle and the metal part of the tubular surfaces, the baffle comprises a barrel structure made of metal sheets and having a plurality of spiral pits on a surface, and the pits form, in the annular channel, a plurality of spiral channels surrounding the internal tubular surface to allow the fluids to pass in parallel.

Optionally, the spiral channels leave a straight-through channel therebetween to allow part of the fluids to directly pass through adjacent spiral channels, to increase turbulence effects.

According to another illustrative embodiment of the present disclosure, a baffle having a thermal conductive baffle disposed in a fluid channel, wherein the fluid channel is an annular channel formed by internal and external tubular surfaces mutually nested, at least one part of the two tubular surfaces is formed by metal, the baffle clings to the two tubular surfaces and maintains good thermal contact with the metal part of the tubular surfaces, fluids passing through the annular channel exchange heat with substances outside the annular channel by means of the baffle and the metal part of the tubular surfaces, and the baffle comprises two layers of metal wires surrounding the internal tubular surface, wherein each layer of metal wires comprises a plurality of metal wire sections with gaps therebetween and arranged in parallel, and at least part of the wire sections in the two layers of metal wires are not parallel to each other.

According to another illustrative embodiment of the present disclosure, a baffle having a thermal conductive baffle disposed in a fluid channel, wherein the fluid channel is an annular channel formed by internal and external tubular surfaces mutually nested, at least one part of the two tubular surfaces is formed by metal, the baffle clings to the two tubular surfaces and maintains good thermal contact with the metal part of the tubular surfaces, fluids passing through the annular channel exchange heat with substances outside the annular channel by means of the baffle and the metal part of the tubular surfaces, the baffle is formed by a plurality of sheet-like objects superposed in the fluid channel with gaps, the plurality of sheet-like objects each has an opening that allows the fluids to pass, at least one part of the sheet-like objects are spoilers, whose opening is configured such that the fluids passing through the fluid channel need to circuitously pass between the spoilers, and at least one part of the sheet-like object is made of metal and thermally contacts the metal part of the tubular surfaces.

Optionally, openings of any two closest spoilers do not overlap each other in a main surface direction and are separately adjacent to the internal and external tubular surfaces forming the annular channel.

According to another illustrative embodiment of the present disclosure, a baffle having a thermal conductive baffle disposed in a fluid channel, wherein the fluid channel is an annular channel formed by internal and external tubular surfaces mutually nested, at least one part of the two tubular surfaces is formed by metal, the baffle clings to the two tubular surfaces and maintains good thermal contact with the metal part of the tubular surfaces, fluids passing through the annular channel exchange heat with substances outside the annular channel by means of the baffle and the metal part of the tubular surfaces, the baffle has a barrel structure made of metal to partition the annular channel into internal and external annular channels mutually nested, and solid baffle structures are formed in the two annular channels separately, and separately thermally contact the barrel structure and the metal part of the two tubular surfaces.

Optionally, the solid baffle structures form, in the annular channels, a plurality of spiral channels that allows the fluids to pass in parallel.

Optionally, a straight-through channel is disposed between the spiral channels to allow part of the fluids to pass through adjacent spiral channels by means of the straight-through channel, to increase turbulence effects.

Optionally, the barrel structure is porous.

Optionally, the internal and external annular channels have the baffle according to the present invention.

According to another illustrative embodiment of the present disclosure, a baffle having a thermal conductive baffle disposed in a fluid channel, wherein the fluid channel is formed between two parallel sheet-like objects and a plurality of metal pipes passing through the two sheet-like objects, the two sheet-like objects tightly nest the plurality of metal pipes, the baffle comprises a plurality of first metal wires parallel to each other and a plurality of second metal wires parallel to each other, which are superposed not in parallel to each other to form a metal net, the metal net has a plurality of through holes corresponding to the plurality of metal pipes so as to tightly nest and thermally contact the plurality of metal pipes, and fluids passing through the fluid channel pass through gaps between the two layers of metal wires and the plurality of metal pipes in disorder and exchange heat with substances in the plurality of metal pipes by means of the net-like baffle and the plurality of metal pipes.

According to another illustrative embodiment of the present disclosure, a baffle having a thermal conductive baffle disposed in a fluid channel, wherein the fluid channel is formed jointly by an inner wall of a pipeline and outer walls of a plurality of metal pipes disposed in the pipeline and parallel to the centerline of the pipeline, the baffle is formed by parallel superposition of a plurality of sheet-like objects whose surface is provided with a plurality of grooves, the sheet-like objects have a plurality of through holes corresponding to the plurality of metal pipes so as to tightly nest the plurality of metal pipes, grooves on surfaces of two adjacent sheet-like objects are not parallel to each other, the plurality of sheet-like objects each has an opening that allows fluids to pass, at least one part of the sheet-like objects are spoilers, configured such that openings of any two closest spoilers do not overlap each other in a main surface direction, so that the fluids passing through the fluid channel need to circuitously pass between the spoilers, at least one part of the sheet-like objects is made of metal and thermally contacts the plurality of metal pipes, and the fluids pass between the grooves in disorder when passing through the fluid channel, and exchange heat with substances in the metal pipes by means of the metallic sheet-like object and the plurality of metal pipes in thermal contact therewith.

According to another illustrative embodiment of the present disclosure, a baffle having a thermal conductive baffle disposed in a fluid channel, wherein the fluid channel is formed jointly by an inner wall of a pipeline and outer walls of a plurality of metal pipes disposed in the pipeline and parallel to the centerline of the pipeline, the baffle is formed by superposition of a plurality of net-like spoilers, each of the net-like spoilers comprises a plurality of first metal wires parallel to each other and a plurality of second metal wires parallel to each other, the first metal wires and the second metal wires are not in parallel to each other and the first metal wires are superposed on the second metal wires, and each of the net-like spoilers has a plurality of through holes corresponding to the metal pipes so as to nest and thermally contact the metal pipes, and fluids pass between the first and second metal wires in turbulence, and exchange heat with substances in the metal pipes by means of the baffle and the metal pipes.

Optionally, the net-like spoilers are constructed to form rings having substantially the same width with the through holes as centers, the rings are connected with each other, and except the part of rings, other parts of the net-like spoilers form gaps.

Optionally, the net-like spoilers are constructed to form rings having substantially the same width with the through holes as centers, the rings are connected with each other, and except the part of rings, the first metal wires and the second metal wires in other parts of the net-like spoilers are flattened to close meshes therebetween.

According to another illustrative embodiment of the present disclosure, a thermal conductive baffle disposed in a fluid channel, wherein the fluid channel has two parallel surfaces, at least one part of the two parallel surfaces is made of metal, the baffle is formed by at least two layers of non-parallel metal wires, which separately form two parallel surfaces of the fluid channel through contact and thermally contact the metal part, and fluids passing through the fluid channel pass between the metal wires, and exchange heat with substances outside the channel through the metal wires and the metal part forming the channel.

Optionally, each layer of metal wires comprises a plurality of metal wire sections parallel to each other.

Optionally, part of metal wire sections of at least two layers of metal wires of the multiple layers of metal wires are formed by the same metal wire and are connected through at least one bend.

Optionally, the baffle is formed through the following process: a. disposing one or more spiral spring-like metal wires in a circular metal pipe with gaps; and b. flattening the circular metal pipe to form two parallel surfaces, and making the two parallel surfaces press against the plurality of metal wires.

Optionally, the baffle comprises four layers of metal wires.

Optionally, the baffle is formed through the following process: a. curling a metal net formed by two layers of non-parallel metal wires into a cylindrical shape to be placed in a circular metal pipe; and b. flattening the circular metal pipe to form two parallel surfaces, and making the two parallel surfaces press against the layers of metal wires forming the net-like cylinder.

According to another illustrative embodiment of the present disclosure, a fluid heat exchanger, comprising: a metal pipe, in which a first fluid channel that allows a first fluid to pass is formed; and a second fluid channel surrounding the metal pipe, wherein a metal protruding spiral baffle structure in good thermal contact with the metal pipe is formed on an inner wall of the metal pipe; in use, the metal pipe is basically arranged vertically, and the first fluid passing therein does not fill a cavity of the metal pipe, is attached to the inner wall of the metal pipe, is spirally downward along the baffle structure, and exchanges heat with a second fluid passing from the bottom up in the second fluid channel through the metal pipe and the protruding metal spiral structure.

Optionally, the spiral baffle structure has a plurality of open ends.

Optionally, open ends of the spiral baffle structure are covered or form a slope to reduce accumulation of fouling at the open ends.

Optionally, the second fluid channel is an annular channel jointly formed by an inner wall of a second fluid pipeline and an outer wall of a metal pipe disposed in the second fluid pipeline.

Optionally, the annular channel has a metal baffle thermally contacting the metal pipe, and a second fluid passing through the annular channel exchanges heat with the first fluid passing through the metal pipe through the baffle and the metal pipe in thermal contact therewith.

Optionally, the annular channel has the baffle according the present invention.

Optionally, the second fluid channel is formed by one or more flat metal pipes having two parallel surfaces, the flat metal pipe spirally and tightly nests the metal pipe, and one of the parallel surfaces clings to an outer wall of the metal pipe.

Optionally, the flat metal pipe has the baffle according to the present invention.

According to another illustrative embodiment of the present disclosure, a fluid heat exchanger, comprising: a first fluid collector having an opening, a cavity and a plurality of first fluid outlets, wherein the opening covers all the first fluid outlets, and a first fluid is collected and introduced to the cavity, and then is exported out of the first fluid outlets in parallel; a housing having a second fluid inlet, a second fluid outlet and a second fluid cavity between the second fluid inlet and the second fluid outlet; and a plurality of metal pipes each placed in the second fluid cavity, and forming a plurality of first fluid channels passing through the second fluid cavity and the housing to allow the first fluid to pass in parallel, the first fluid channels separately communicating with the first fluid outlets of the first fluid collector to receive the first fluid exported from the first fluid outlets, wherein the second fluid cavity has a metal baffle thermally contacting the plurality of metal pipes; and the second fluid inlet is used for introducing a second fluid whose temperature is different from that of the first fluid, which passes through the second fluid cavity, and exchanges heat with the first fluid passing in parallel in the first fluid channels by means of the plurality of metal pipes and the metal baffle, so that the temperature of the second fluid is changed and then the second fluid is exported from the second fluid outlet.

Optionally, the opening of the first fluid collector is used for introducing the first fluid into the cavity of the first fluid collector.

Optionally, the metal pipes are formed by mutual nesting of internal and external metal pipes, the internal and external metal pipes maintain good thermal contact therebetween and are provided with a micro-channel that allows the first or second fluid to pass when the internal or external metal pipe breaks.

Optionally, the micro-channel is communicated to the outlet above the plurality of metal pipes.

Optionally, the flow divider comprises a plurality of baffles for evenly introducing the first fluid into the plurality of first fluid channels.

Optionally, the flow divider is detachably installed to the opening of the first fluid collector.

Optionally, the first fluid is a liquid, the baffles are disposed adjacent to the first fluid outlet and are provided with through holes, and each through hole communicates with an air vent disposed in a higher position.

Optionally, the through hole is communicated to the air vent through a vent pipe and the collector is further provided with a filtration device which has a through hole nested to the vent pipe.

Optionally, the baffles are spiral members disposed in the first fluid channel, which facilitate the first fluid to spirally pass in the first fluid channel.

Optionally, the baffles are detachable.

Optionally, inner walls of the metal pipes are provided with spiral protruding metal baffle structures in thermal contact with the metal pipes.

Optionally, upstream open ends of the spiral baffle structure are covered or form a slope to reduce accumulation of fouling at the open ends.

Optionally, a plurality of second fluid annular channels separately surrounding each metal pipe to allow the second fluid to pass in parallel is formed in the second fluid cavity and the second fluid channel has the metal baffle according to the present invention, which thermally contacts the metal pipes.

Optionally, the second fluid cavity has a baffle formed by parallel superposition of a plurality of sheet-like objects with gaps, each of the sheet-like objects has a plurality of through holes corresponding to the metal pipes so as to nest the metal pipes, at least one part of the sheet-like objects is made of metal and thermally contacts the metal pipes, at least one part of the sheet-like objects are spoilers, on which an opening that allows the second fluid to pass is formed, and openings of any two closest spoilers do not overlap each other in a main surface direction of the spoilers, to facilitate the second fluid to circuitously pass between the spoilers in the second fluid cavity, and to exchange heat with the first fluid in the metal pipes by means of the baffle and the metal pipes.

Optionally, the sheet-like objects have the baffle according to the present invention therebetween, which thermally contacts the plurality of metal pipes.

Optionally, the second fluid cavity has the baffle according to the present invention.

Optionally, the first fluid is a liquid, and centerlines of the plurality of metal pipes are basically arranged horizontally.

Optionally, a section of an inner wall of the metal pipes is flat and has a major axis and a minor axis, and the major axis is basically arranged horizontally.

Optionally, the inner wall of the metal pipes has two parallel surfaces and the two parallel surfaces have the baffle according to the present invention therebetween.

Optionally, a vertical height of the inner wall of the metal pipes is not more than 6.5 mm.

According to another illustrative embodiment of the present disclosure, an energy recovery device, comprising: the heat exchanger according to the present invention; and an external temperature-varying apparatus, wherein the second fluid after heat exchange in the heat exchanger is introduced into the external temperature-varying apparatus, the temperature of the second fluid is changed to a suitable operating temperature, and the second fluid, after use, serves as the first fluid introduced into the heat exchanger.

Optionally, the external temperature-varying apparatus comprises a heater or a cooler.

Optionally, the external temperature-varying apparatus comprises a fluid mixer mixing the second fluid after heat exchange with an external preheated or precooled third fluid to change the temperature.

Optionally, the first fluid is wastewater, and the second fluid is clean water.

Optionally, the heat exchanger is installed to the bottom of a bathtub or a sink of a washing facility or a base of a shower, or is integrally formed with the base of the shower or the sink, to receive hot wastewater generated in shower or washing.

Optionally, a drain hole of the bathtub, the sink of the washing facility, or the shower covers all first fluid outlets in a horizontal direction.

BRIEF DESCRIPTION OF THE DRAWINGS

The basic structure of the present invention is illustrated below with reference to the accompanying drawings, where:

FIG. 5 is a schematic view of a metal strip in the first embodiment of the baffle according to the present invention;

FIG. 6 is a perspective view of a second embodiment of the baffle according to the present invention;

FIGS. 7-9 are schematic views of a third embodiment of the baffle according to the present invention;

FIG. 23 is a perspective view showing that the baffle shown in FIG. 22 is installed in the heat exchanger;

FIGS. 24-25 are schematic views of an eleventh embodiment of the baffle according to the present invention;

FIG. 72 is a sectional perspective view of an assembling state of the heat exchanger shown in FIG. 69;

FIG. 73 is an exploded perspective view of the heat exchange pipe shown in FIG. 69;

FIG. 74 is a perspective view of a nested state of the heat exchange pipe shown in FIG. 73;

DETAILED DESCRIPTION OF THE INVENTION

Figures 1, 1A:
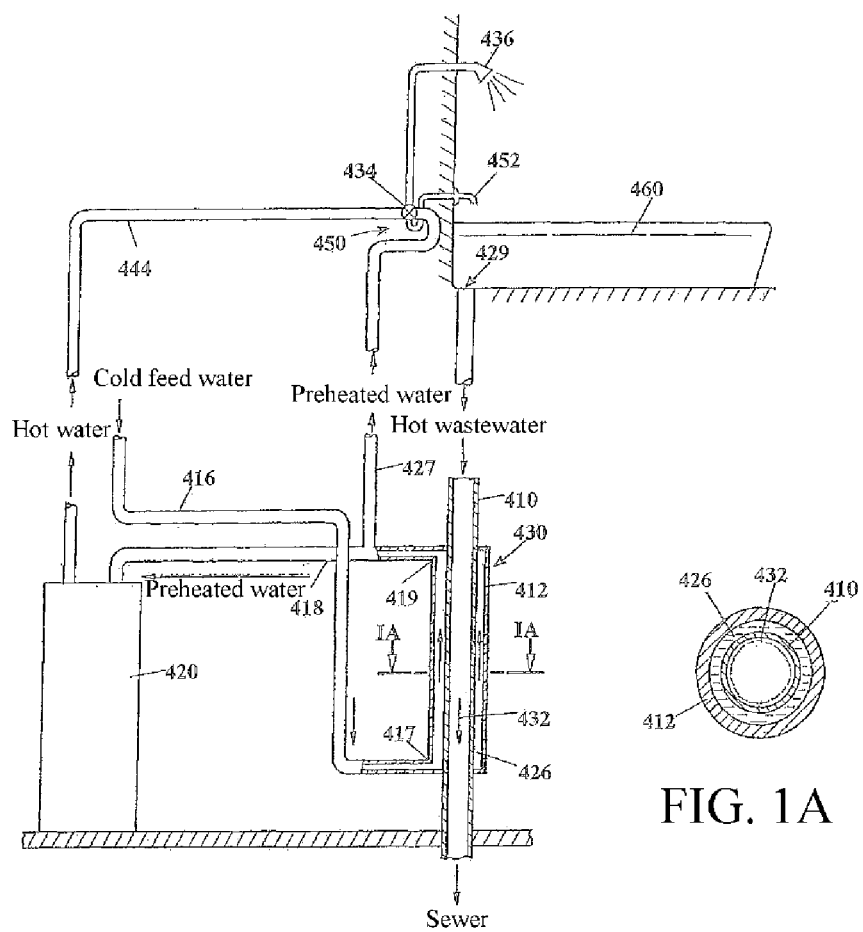
FIG. 1 is a schematic structural view of an equal volume, contraflow heat exchanger and an energy recovery device in the prior art.
FIG. 1A is a sectional view along Line 1A-1A in FIG. 1, illustrating a cross-sectional structure of the heat exchanger in the prior art.

The present invention relates to a thermal conductive baffle, a fluid heat exchanger and an energy recovery device. Embodiments in which the thermal conductive baffle, the fluid heat exchanger and the energy recovery device of the present invention are combined with a bathroom shower and a sink of a washing facility are described below only by way of examples with reference to the accompanying drawings. It should be understood that the present invention is not limited thereto.

FIGS. 2, 2A, 3 and 4 illustrate a structure of a first embodiment of a fluid heat exchanger according to the present invention. The heat exchanger 1 includes a heat exchanger main body 11 and a baffle 31. The heat exchanger main body 11 includes a housing 13 and a metal pipe 15. The housing 13 has a cold water (second fluid) inlet 17, a tepid water (preheated second fluid) outlet 18 and a cold water (second fluid) conduit 19 between the cold water inlet 17 and the tepid water outlet 18. The metal pipe 15 is vertically disposed in the cold water conduit 19 and passes through the housing 13, and a hot wastewater (first fluid) channel 21 for hot wastewater (first fluid) to pass through is formed in the metal pipe 15. A protruding baffle structure 22 is disposed on an inner wall of the metal pipe 15. The baffle structure 22 is formed by one or more solid metal spiral structures extending along a length direction of the metal pipe 15 and maintains good thermal contact with the inner wall of the metal pipe 15. The baffle structure 22 can be assembled into the metal pipe 15 in the following manner:

a. spiraling and coiling one or more solid metal wires on a straight bar with gaps, to such that overall outer diameter thereof less than the inner diameter of the metal pipe 15;

b. placing the straight bar and the metal wires together in a suitable position within the metal pipe 15;

c. loosening the metal wires, such that the metal wires naturally rebound to press against the inner wall of the metal pipe 15; and d. removing the straight bar.

A cold water (second fluid) annular channel 23 (FIG. 3) surrounding an outer wall of the metal pipe 15 is formed between the metal pipe 15 and the cold water conduit 19. In the following description about various embodiments of the present invention, the first fluid is hot wastewater and the second fluid is cold water as an example for illustration, but the present invention is not limited thereto.

During the operation of the heat exchanger 1, the cold water inlet 17 is directly or indirectly connected to a cold water source (not shown) of a building, the tepid water outlet 18 is connected to a bathroom heater (not shown) or a mixing valve (not shown), and the hot wastewater channel 21 is communicated to a drain pipe (not shown) of a shower device or the like to receive hot wastewater generated during shower. The inner diameter of the hot wastewater channel 21 is designed such that hot wastewater generated generally by shower is not sufficient to fill its cavity. The hot wastewater attaches to an inner wall of the hot wastewater channel 21 to slowly flow downwards. The baffle structure 22 slows down the speed at which the hot wastewater flows downwards and facilitates the spiral motion of the hot wastewater in the metal pipe 15 to delay the time period of its stay in the hot wastewater channel 21. In the meantime, heat exchange surface of the hot wastewater is also significantly increased. These all effectively enhance heat exchange efficiency of the heat exchanger. To further enhance the efficiency of heat conduction between the baffle structure 22 and the metal pipe 15 and prevent the baffle structure 22 from shifting, a layer of solder may be pre-coated on surfaces of the metal wires. After the metal wires are placed in the metal pipe 15, relevant parts may be placed in a high-temperature furnace for heating, so that the solder melts to braze the baffle structure onto the inner wall of the metal pipe 15. Certainly, the baffle structure is optional, which may be omitted in the following drawings and description of embodiments.

Figure 2:
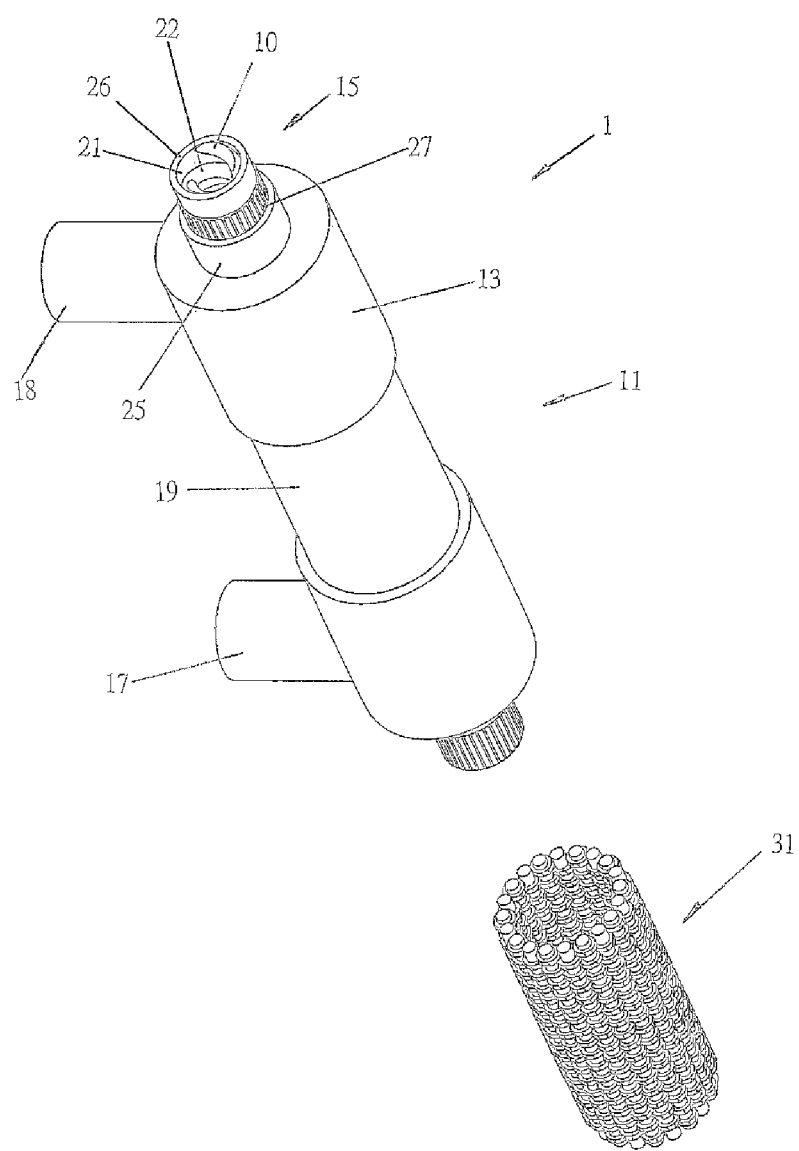
FIG. 2 is an exploded perspective view of a first embodiment of a fluid heat exchanger according to the present invention, illustrating a schematic structural view of a first embodiment of a baffle according to the present invention.
Figure 2A:
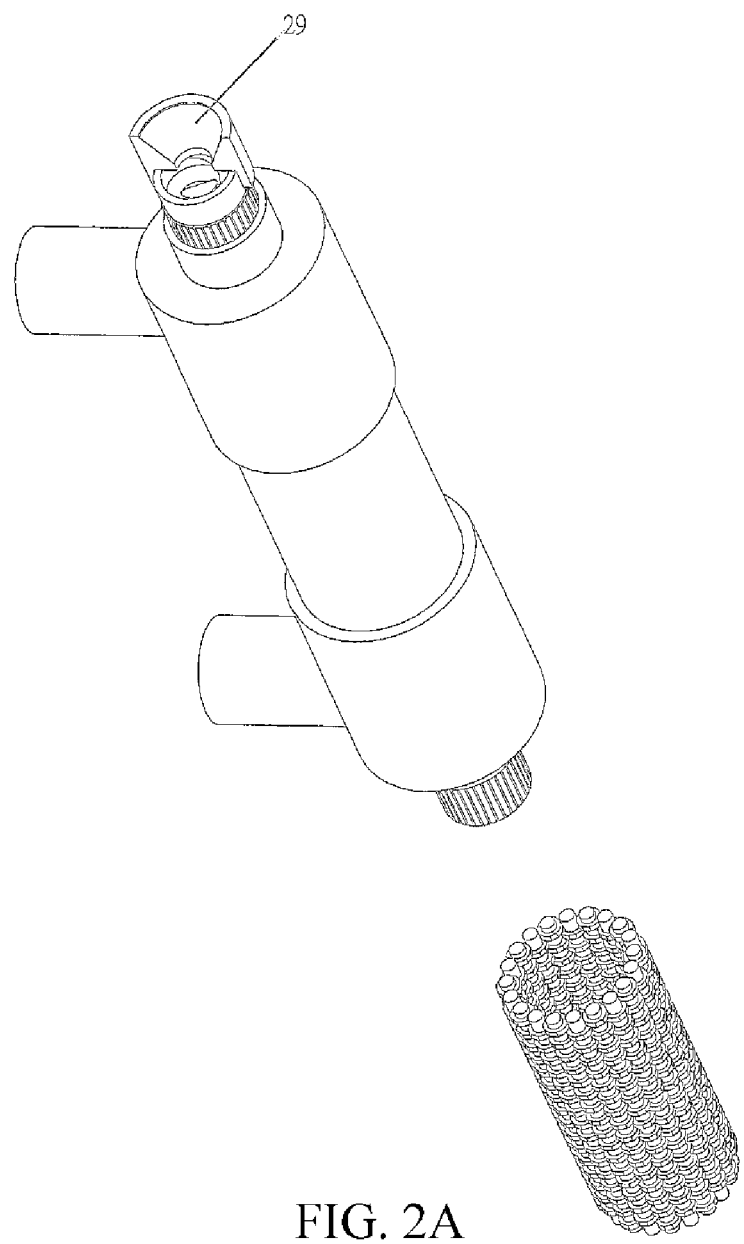
FIG. 2A is a schematic view showing that a protruding spiral structure in a wastewater channel covered by a ring according to a first embodiment of the present invention.

To reduce that fouling (such as hair) accumulated on one or more open ends of the top (upstream) of the protruding spiral structure 22 affecting the drainage effect, the open ends may form a slope 10 (FIG. 2) that facilitates the fouling to slide or may be covered by another ring 29 as illustrated in FIG. 2a.

Meanwhile, the cold water is introduced from the cold water inlet 17 to flow through the cold water annular channel 23 from the bottom up, and exchanges heat with hot wastewater flowing through the hot wastewater channel 21 by means of the metal pipe 15, so that the temperature of the cold water is changed and the cold water becomes preheated water, and then exported from the tepid water outlet 18 and provided to the bathroom heater or the mixing valve (not shown) for use.

Figure 3:
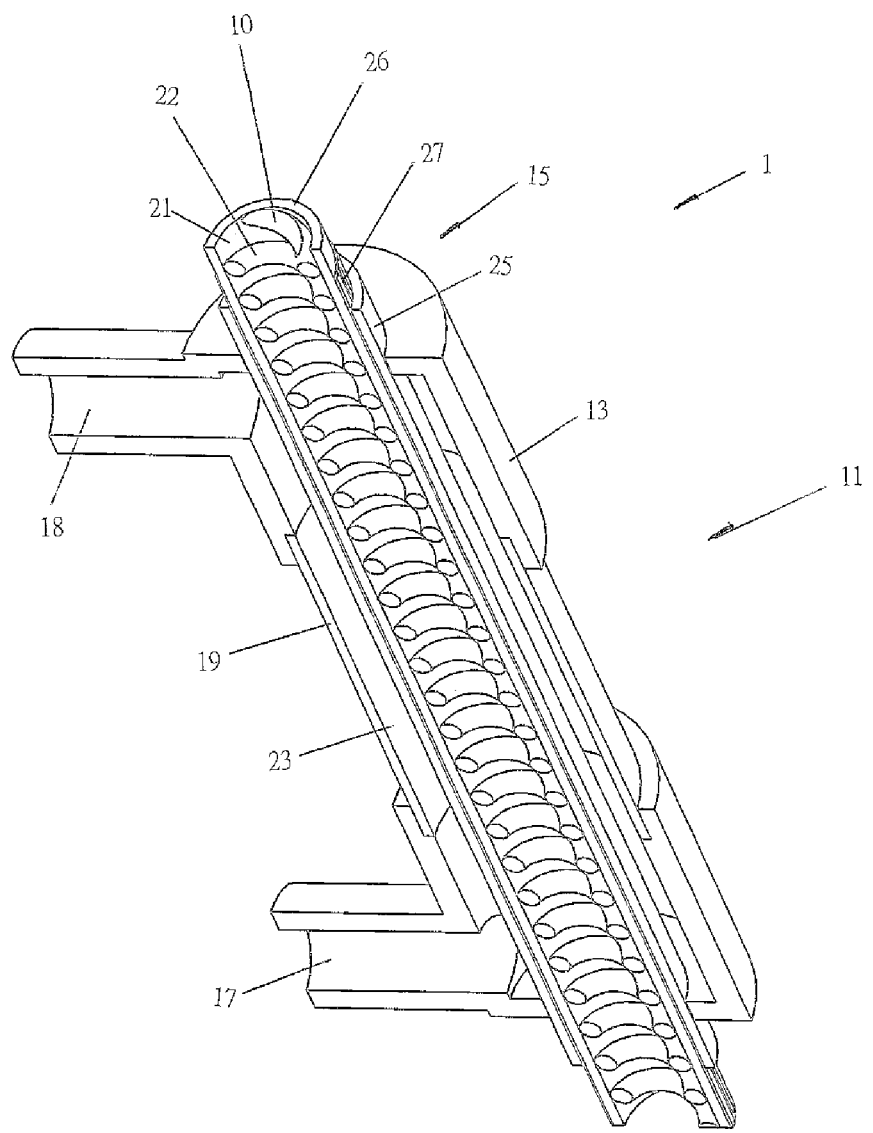
FIG. 3 is a sectional perspective view of the main body of the fluid heat exchanger shown in FIG. 2.
Figure 4:
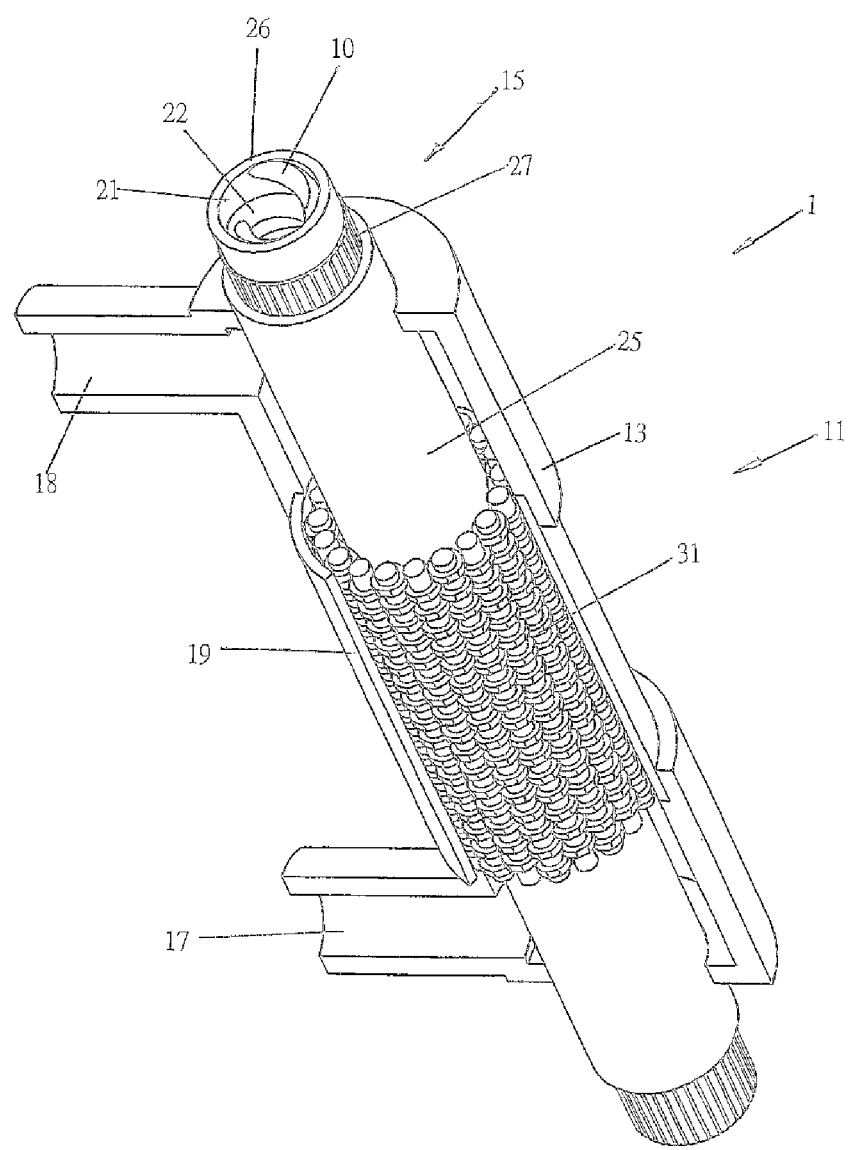
FIG. 4 is a sectional perspective view of an assembling state of the fluid heat exchanger shown in FIG. 2.

As shown in FIGS. 2-4, the metal pipe 15 is formed by mutual nesting of two metal pipes, i.e., an external metal pipe 25 and an internal metal pipe 26, and the external metal pipe 25 and the internal metal pipe 26 maintain good thermal contact therebetween, and leave a micro-channel 27 that can allow the wastewater or cold water to pass through. The micro-channel 27 is formed between the external metal pipe 25 and the internal metal pipe 26 by having small concave-convex structures on a surface of the internal metal pipe 26 through knurling or the like. Under normal conditions, no cold water or wastewater seeps leak out from the micro-channel 27 between the external metal pipe 25 and the internal metal pipe 26. However, when one of the external metal pipe 25 or the internal metal pipe 26 is damaged to cause seepage of cold water or hot wastewater, the cold water or hot wastewater may flow out of the heat exchanger 1 through the micro-channel 27 and alert the user. Certainly, the nested structure is optional, and for the sake of simplicity, in the following drawings and description, the metal pipe 15 may be illustrated and described in the form of a single piece.

The heat exchanger 1 in the first embodiment of the fluid heat exchanger according to the present invention further includes a baffle 31, to further improve the heat exchange efficiency. As shown in FIG. 4, the baffle 31 surrounding the metal pipe 15 is disposed in the cold water annular channel 23 formed by tubes, i.e., the metal pipe 15 and the cold water conduit 19. The baffle 31 is made of metal, which tightly presses against on the inner wall of the cold water conduit 19 and maintains good thermal contact with the outer wall of the metal pipe 15. A manner in which the baffle 31 is installed may include welding, or after the baffle 31 is placed, the inner diameter of the metal pipe 15 is slightly expanded so that the outer wall of the metal pipe 15, the baffle 31 and the inner wall of the cold water conduit 19 pressed together.

FIGS. 2, 3 and 4 illustrate a structure of a first embodiment of a thermal conductive baffle according to the present invention. The baffle 31 includes a plurality of solid metal strips 33 (see FIG. 5). A plurality of solid annular projections 34 is spaced apart along a length direction of the metal strips 33. The plurality of solid metal strips 33 is adjacently configured around the outer wall of the metal pipe 15 with their centerlines parallel to the centerline of the metal pipe 15. The cold water is blocked by the plurality of metal strips 33 when passing through the cold water annular channel 23, and the cold water passes through between the outer wall of the metal pipe 15, the metal strips 33, the annular projections 34 and the inner wall of the cold water conduit 19 in turbulence, and exchanges heat with the hot wastewater flowing through the hot wastewater channel 21 by means of heat conduction of the baffle 31 and the metal pipe 15. The thermal conductive baffle 31 significantly increases the heat exchange surface with the cold water and can constantly change the flow direction of the cold water to generate a turbulence effect, thereby improving the heat exchange efficiency. The cold water conduit 19 may also be made of metal, so that the inner wall of the cold water conduit 19 also becomes the heat exchange surface with the cold water.

FIG. 6 illustrates a structure of a second embodiment of a thermal conductive baffle according to the present invention. The baffle 41 is made of one or more solid metal strips 33 as shown in FIG. 5. The metal strips 33 spirally extend with their centerlines around the outer wall of the metal pipe 15. The function and the effect of the baffle 41 are substantially the same as those of the baffle 31, which are not repeated herein.

Figure 9:
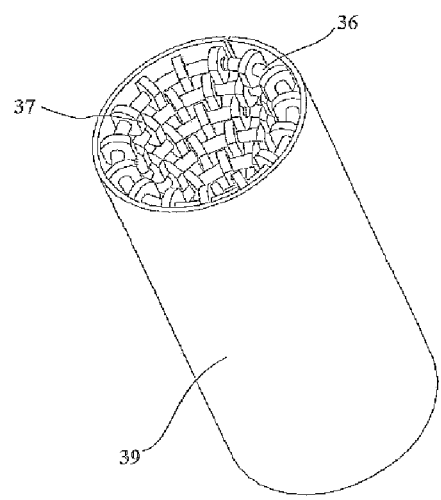

FIGS. 7-9 illustrate a structure of a third embodiment of a thermal conductive baffle according to the present invention. The baffle 41' includes a plurality of solid metal strips 36 made of metal. A plurality of solid annular projections 37 are spaced apart from each other along a length direction of the metal strips 36. Each of the metal strips 36 surrounds the metal pipe with its centerline perpendicular to the centerline of the metal pipe 15, and the annular projections 37 of adjacent metal strips 36 are staggered. The function and the effect of the baffle 41' are substantially the same as those of the baffle 31, which are not repeated herein.

To facilitate assembly of the plurality of metal strips 36, planes 38 back to each other may be formed on the solid annular projections 37, and then the metal strips 36 are fixed to a metal sheet 39 by means of the planes 38. Afterwards, the metal sheet 39 is bent into a cylindrical shape (FIG. 9) to be nested onto the metal pipe 15, and another plane 38 of the annular projections 37 is pressed against the metal pipe 15. In this way, a contact area of the baffle 41' and the metal pipe 15 is increased, and the thermal conductive function is enhanced.

Figure 10:
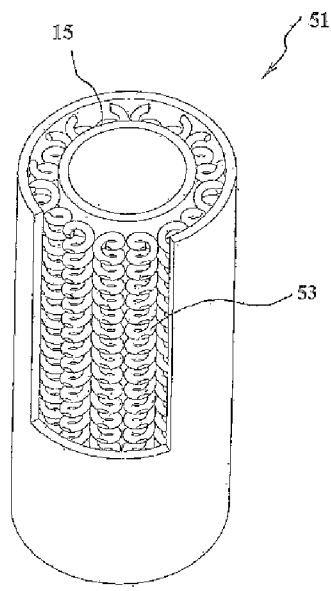
FIG. 10 is a perspective view of a fourth embodiment of the baffle according to the present invention.
Figure 11:
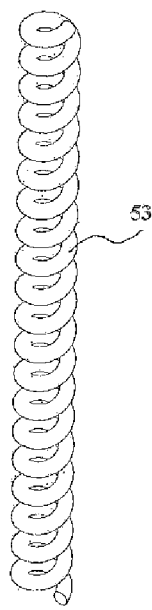
FIG. 11 is a schematic view of a spiral spring-like metal strip in the fourth embodiment of the baffle according to the present invention.

FIGS. 10-11 illustrate a structure of a fourth embodiment of a thermal conductive baffle according to the present invention. The baffle 51 includes a plurality of spiral spring-like metal strips 53 (see FIG. 11) made of solid metal wires. The metal strips 53 are adjacently configured around the outer wall of the metal pipe 15 with their centerlines parallel to the centerline of the metal pipe 15. The function and the effect of the baffle 51 are substantially the same as those of the baffle 31, which are not repeated herein.

Figure 12:
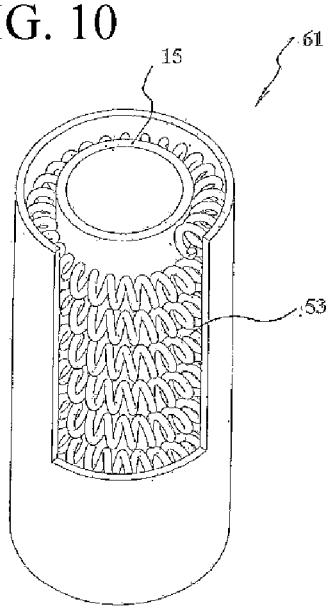
FIG. 12 is a perspective view of a fifth embodiment of the baffle according to the present invention.

FIG. 12 illustrates a structure of a fifth embodiment of a thermal conductive baffle according to the present invention. The baffle 61 is formed by one or more metal strips 53 as shown in FIG. 11. The metal strips 53 spirally extend with their centerlines around the outer wall of the metal pipe 15. The function and the effect of the baffle 61 are substantially the same as those of the baffle 31, which are not repeated herein.

Similarly, the metal strips 53 shown in FIG. 12 may also surround the metal pipe with their centerlines perpendicular to the centerline of the outer wall of the metal pipe 15, so as to construct a baffle (not shown) similar to the baffle shown in FIG. 7.

Figure 13:
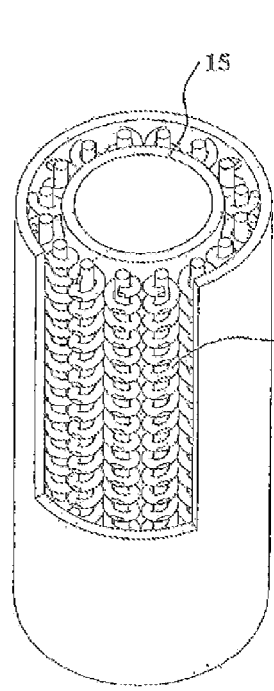
FIG. 13 is a perspective view of a sixth embodiment of the baffle according to the present invention.
Figure 14:
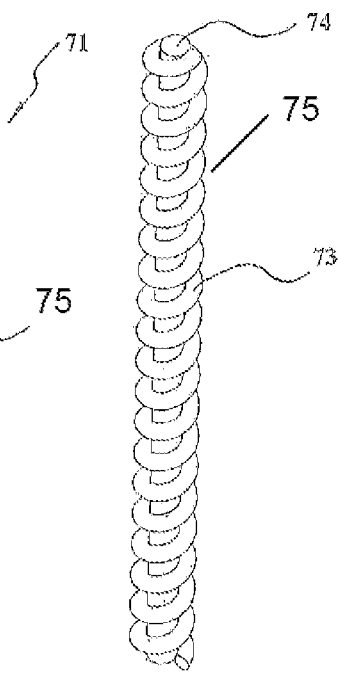
FIG. 14 is a schematic view of spiral spring-like metal strips in the sixth embodiment of the baffle according to the present invention.

FIGS. 13-14 illustrate a structure of a sixth embodiment of the baffle having a thermal conductive baffle according to the present invention. The baffle 71 includes a plurality of metal strip 75, each comprises a first spiral spring-like metal element 73 (see FIG. 14) and a second metal strips 74 extending along the center of the spiral element 73 to increase the heat exchange surface. The second metal strips 74 shown in FIG. 14 are straight bars, but they may be various kinds of metal strips described previously or below. The metal strips 75 are adjacently configured around the outer wall of the metal pipe 15 with their centerlines parallel to the centerline of the metal pipe 15. The function and the effect of the baffle 71 are substantially the same as those of the baffle 31, which are not repeated herein.

Similarly, one or more metal strips 75 shown in FIG. 14 may spirally extend with their centerlines around the outer wall of the metal pipe 15, or the plurality of metal strips surrounds the metal pipe with their centerlines perpendicular to the centerline of the metal pipe 15, so as to construct a baffle (not shown) similar to the baffle shown in FIGS. 6 and 7.

Figure 15:
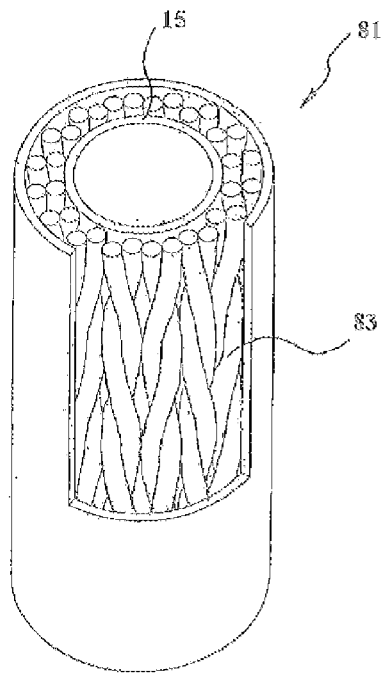
FIG. 15 is a perspective view of a seventh embodiment of the baffle according to the present invention.
Figure 16:
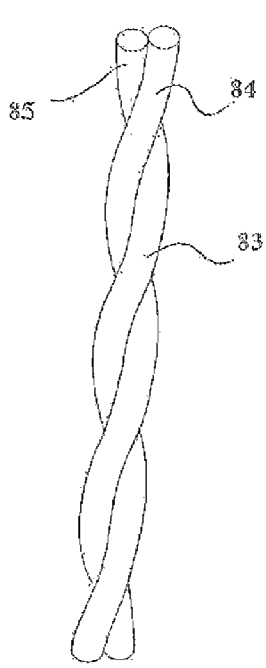
FIG. 16 is a schematic view of metal strips of metal wires in the seventh embodiment of the baffle according to the present invention.

FIGS. 15-16 illustrate a structure of a seventh embodiment of a thermal conductive baffle according to the present invention. The baffle 81 includes a plurality of metal strips 83 (see FIG. 16), and each of the metal strips 83 is made by intertwining of two solid metal wires 84 and 85, on whose surface there is a spiral concave structure. The metal strips 83 are adjacently configured around the outer wall of the metal pipe 15 with their centerlines parallel to the centerline of metal pipe 15. The metal strips may also be formed by intertwining of a plurality of metal wires. The function and the effect of the baffle 81 are substantially the same as those of the baffle 31, which are not repeated herein.

Similarly, one or more metal strips 83 shown in FIG. 16 can spirally extend with their centerlines around the outer wall of the metal pipe 15, or the plurality of metal strips 83 surrounds the outer wall of the metal pipe with their centerlines perpendicular to the centerline of the metal pipe 15, so as to construct a baffle (not shown) similar to the baffle shown in FIGS. 6 and 7.

Figure 17:
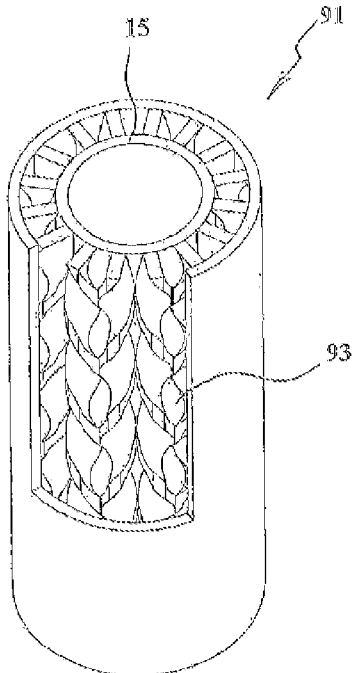
FIG. 17 is a perspective view of an eighth embodiment of the baffle according to the present invention.
Figure 18:
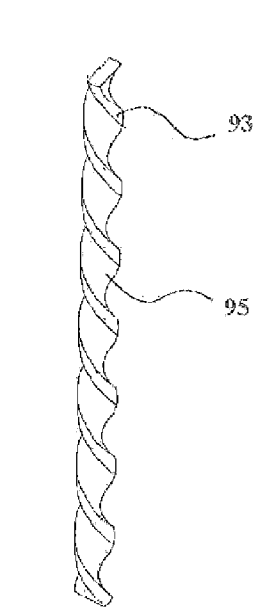
FIG. 18 is a schematic view of a metal spiral strip in the eighth embodiment of the baffle according to the present invention.

FIGS. 17-18 illustrate a structure of an eighth embodiment of a thermal conductive baffle according to the present invention. The baffle 91 includes a plurality of metal spiral strips 93 having rectangular or non-circular cross-sections, on whose surfaces there are spiral concave structures 95 (see FIG. 18). The metal spiral strips 93 are adjacently configured around the outer wall of the metal pipe 15 with their centerlines parallel to the centerline of the metal pipe 15. The function and the effect of the baffle 91 are substantially the same as those of the baffle 31, which are not repeated herein.

Similarly, one or more metal spiral strips 93 shown in FIG. 18 can spirally extend with their centerlines around the outer wall of the metal pipe 15, or the plurality of metal strips 93 surrounds the outer wall of the metal pipe with their centerlines perpendicular to the centerline of the metal pipe 15, so as to construct a baffle (not shown) similar to the baffle shown in FIGS. 6 and 7.

Figures 19, 20:
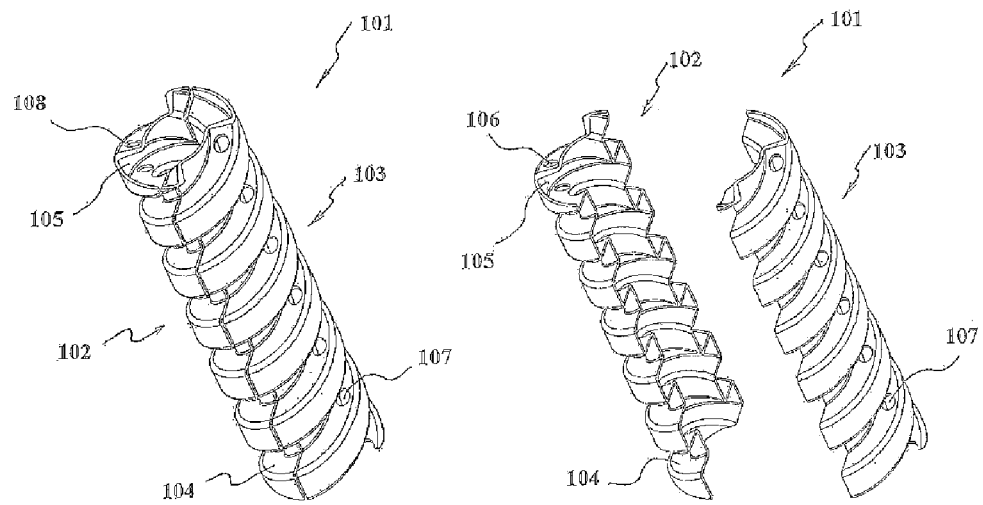
FIG. 19 is a perspective view of a ninth embodiment of the baffle according to the present invention.
FIG. 20 is an exploded perspective view of the ninth embodiment of the baffle according to the present invention.
Figures 21, 22:
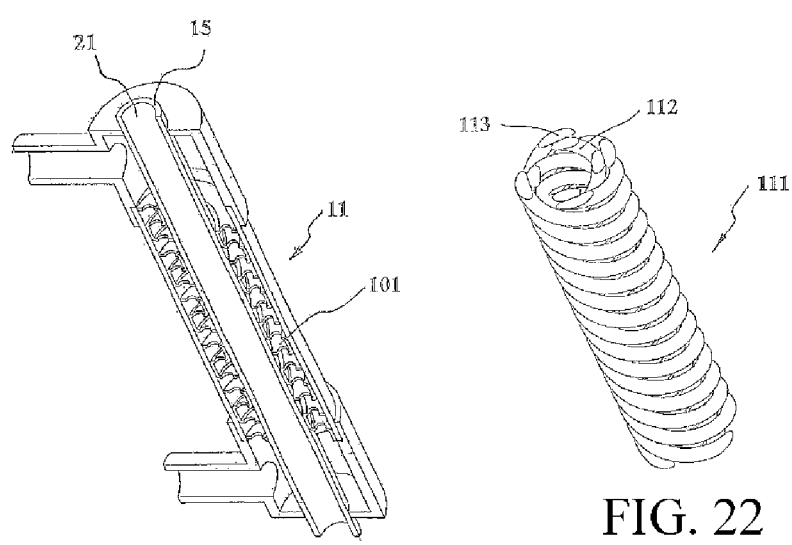
FIG. 21 is a perspective view showing that the baffle shown in FIG. 19 is installed in the heat exchanger.
FIG. 22 is a perspective view of a tenth embodiment of the baffle according to the present invention.

FIGS. 19-20 illustrate a structure of a ninth embodiment of the baffle having a thermal conductive baffle according to the present invention. The baffle 101 has a barrel structure made by stamping of metal, and is formed by two semi-barrel structures 102 and 103, on whose surfaces there are a plurality of spiral pits 104 and 105 to form a plurality of spiral channels that allows the cold water to flow through in parallel, and a plurality of straight-through through holes 106 and 107 is further provided between the spiral pits 104 and 105 to allow part of the cold water to directly pass through adjacent spiral channels with a non-circuitous straight-through path to generate turbulence effects. FIG. 21 illustrates a state in which the baffle 101 is installed in the heat exchanger main body 11. The cold water exchanges heat with the hot wastewater flowing through the hot wastewater channel 21 by means of heat conduction of the baffle 101 and the metal pipe 15 when flowing through the plurality of spiral channels in parallel.

FIG. 22 illustrates a structure of a tenth embodiment of the thermal conductive baffle according to the present invention. The baffle 111 includes two layers of helically configured un-parallel (preferably with reverse helical direction) solid metal wires 112 and 113 overlapping each other that surround the metal pipe 15. Each layer of metal wires 112 and 113 includes a plurality of metal wires sections spaced apart and parallel to each other where the metal wires 112 in the inner layer presses against and thermally contacts the outer wall of metal pipe 15 along the majority of their length, while the metal wires 113 in the outer layers butts against the inner wall of the cold water conduit 19. The cold water passing through the annular channel 23, flows through gaps 114 (see FIG. 23) between the two layers of wires 112 and 113 and exchanges heat with hot wastewater in the wastewater channel 21. The baffle 111 significantly increases the heat exchange surface of cold water and constantly changes the flow direction; these are helpful to improve the heat exchange efficiency of the heat exchanger.

The baffle 111 with thermal conductive function as illustrated in FIG. 22 may be fabricated by method as illustrated in FIG. 22 A:

1. A plurality of metal wires 112A, 112B, 112C and 112D are spirally arranged about mandrel 114 with gaps and in parallel, to form an inner metal wire layer 112;

2. Upon spirally arranged about mandrel 114 for a certain of length, the plurality of metal wire 112A, 112B, 112C and 112D are further spirally arranged about mandrel 114 in counterclockwise direction with gaps and in parallel, to form an outer metal wire layer 113;

3. Prior to relieving or cutting the plurality of metal wires 112A, 112B, 112C and 112D, the two metal wire layers are welded in suitable position with suitable means (such as spot welding) to form a rigid metal tubular mesh;

4. The metal wires are removed from mandrel 114 and then cutting into suitable length to form the baffle as illustrated in FIG. 22.

In the aforementioned example, mandrel 114 may also be replaced by metal tube 15 and directly weld the plurality of metal wires 112A, 112B, 112C and 112D thereon.

By using the method as above, baffle with more than two metal wire layers may be fabricated to increase heat exchange surface and enhance turbulence effect. FIGS. 24-25 illustrate a structure of an eleventh embodiment of the thermal conductive baffle according to the present invention. Structure of baffle 121 is basically same as baffle 111 (FIG. 22) except that it is formed by curling a metal mesh 121' as shown in FIG. 25. The metal mesh 121' includes two layers of metal wires. Each layer includes a plurality of solid straight metal wires 122' and 123' parallel to each other and spaced apart. The two layers are superposed and welded with the wires unparallel to form the mesh 121'. The function and effect of the baffle 121 are substantially the same as those of baffle 111, which are not repeated herein.

Figure 26:
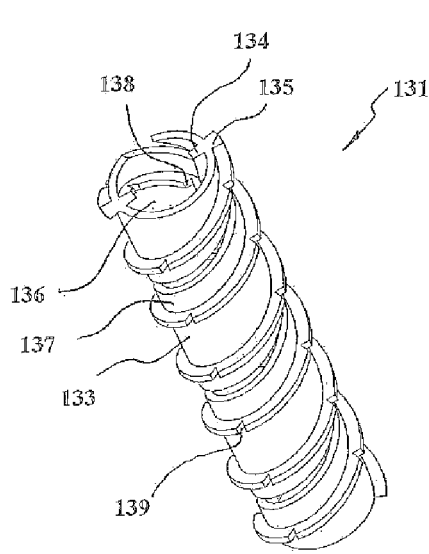
FIG. 26 is a schematic view of a twelfth embodiment of the baffle according to the present invention.
Figure 27:
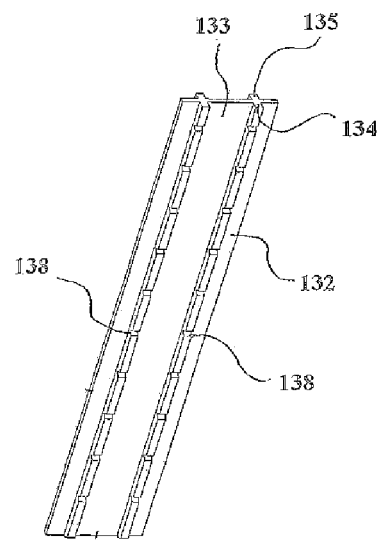
FIG. 27 is a perspective view of a metal strip for manufacturing the baffle shown in FIG. 26.
Figure 28:
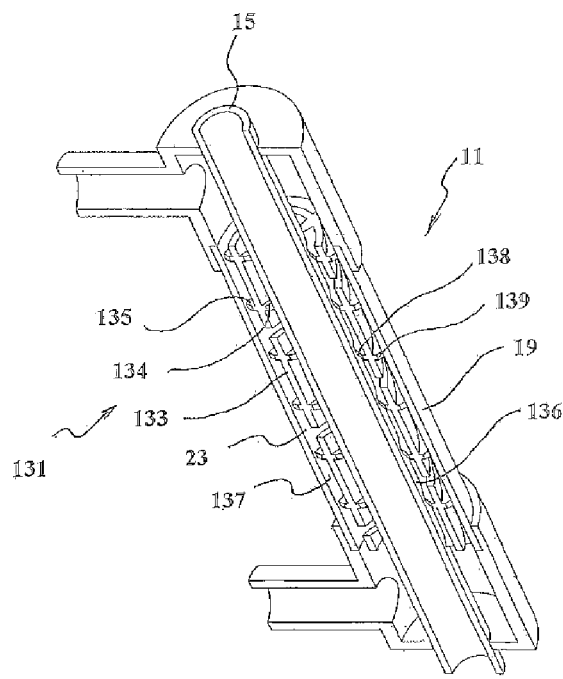
FIG. 28 is a perspective view showing that the baffle shown in FIG. 26 installed in the heat exchanger.
Figure 29:
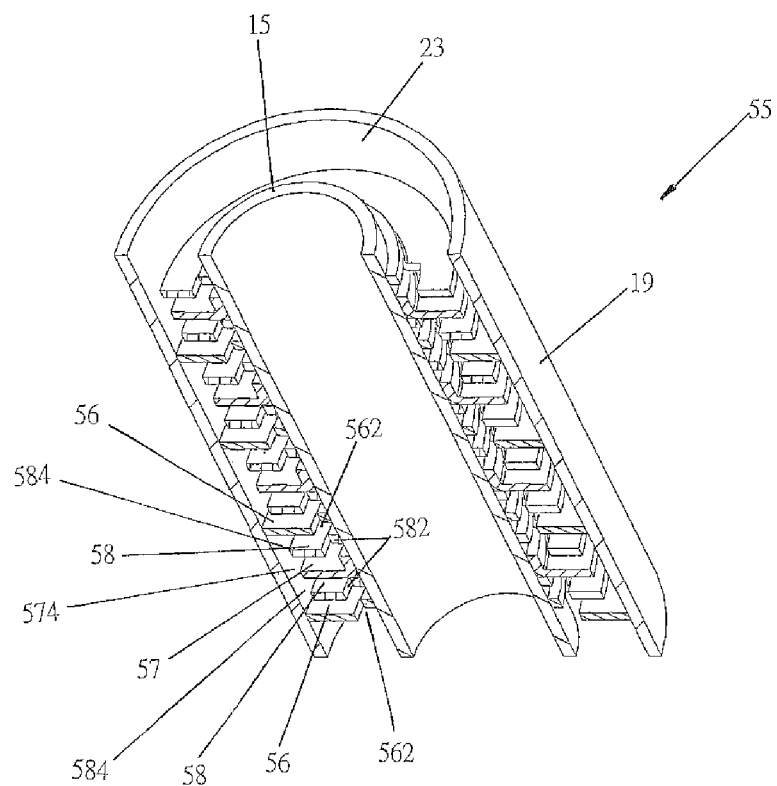
FIG. 29 is a schematic view of a thirteenth embodiment of the baffle according to the present invention.

FIG. 26 illustrates a structure of a twelfth embodiment of a thermal conductive baffle according to the present invention, FIG. 27 illustrates a shape of the metal strips 132 for manufacturing the baffle 131, and FIG. 28 illustrates a state in which the baffle 131 is installed in the heat exchanger main body 11. The baffle 131 has a barrel structure made by cutting of metal strip 132 after curling. Multiple pairs of mutually aligned solid spoilers 134 and 135 functioning to baffle flow are convexly formed on internal and external surfaces of cylindrical walls 133 respectively, and the spoilers 134 and 135 maintain good thermal contact with the outer wall of the metal pipe 15 and press against the inner wall of the conduit 19. The cylindrical walls 133 and the spoilers 134 and 135 respectively form two groups of internal and external spiral channels 136 and 137 in the cold water annular channel 23. The cold water passes through the two groups of internal and external spiral channels 136 and 137 in parallel. Due to heat conduction of the mutually aligned solid spoilers 134 and 135 of the baffle 131 as well as the cylindrical walls 133 and the metal pipe 15, the heat exchange surface with the cold water is significantly increased, thereby improving the heat exchange efficiency. The spoilers 134 and 135 are further respectively provided with a plurality of substantially aligned notches 138 and 139, to allow part of the cold water to directly pass through two adjacent spiral channels 136 and 137 with a non-circuitous straight-through path, thereby generating turbulence effects.

Figure 30:
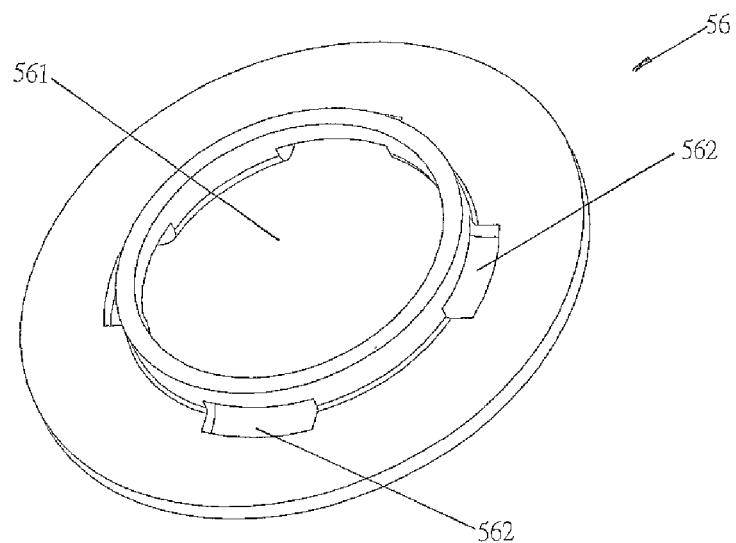
FIGS. 30 and 31 illustrate spoilers of the baffle shown in FIG. 29.
Figure 31:
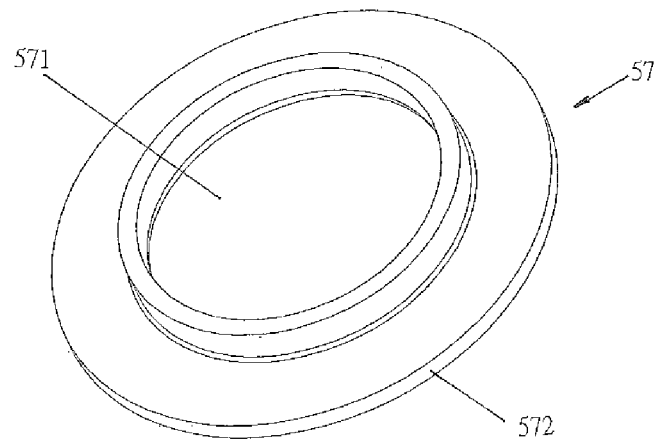
Figure 32:
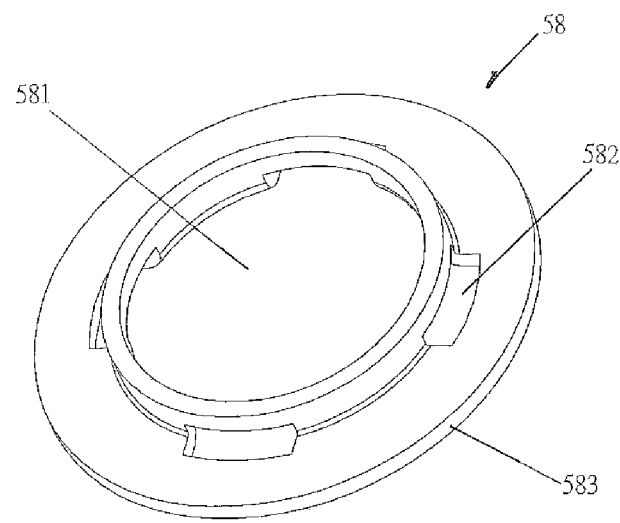
FIG. 32 illustrates a heat transfer sheet of the baffle shown in FIG. 29.

FIG. 29 to FIG. 32 illustrate a structure of a thirteenth embodiment of a thermal conductive baffle according to the present invention. The baffle 55 is horizontally superposed in the annular channel 23 (FIG. 29) through sheet-like objects as shown in FIG. 30 to FIG. 32 with gaps, and the sheet-like objects 56, 57 and 58 (FIGS. 30-32) all have central through holes (561, 581 and 571) for tightly nesting the metal pipe 15 and openings that allow the fluids to pass, where the opening 562 of the sheet-like object 56 (FIG. 30) is formed in adjacent to the central through hole 561, the opening 574 of the sheet-like object 57 (FIG. 31) is formed by a gap between a periphery 572 thereof and the inner wall of the cold water conduit 19, and the sheet-like object 58 (FIG. 32) has two openings, including an opening 582 formed adjacent to the central through hole 581 and an opening 584 formed by a gap between a periphery 583 thereof and the inner wall of the cold water conduit 19. The sheet-like objects 56, 57 and 58 are at least partially made of metal (in the above example, the sheet-like objects 56, 57 and 58 are all made of metal) and thermally contact the outer wall of the metal pipe 15. The sheet-like objects 56 and 57 are spoilers, and any two closest spoiler 56 and 57 when placed in the annular channel 23 (FIG. 29), whose openings do not overlap each other in a main surface direction, so that the cold water passing through the annular channel 23 needs to circuitously flow between the baffle spoiler 56 and 57 alternately from inside to outside and then from outside to inside so as to alternately pass through the openings 562 and 574 to form turbulence effects, and increase the rate of heat exchange.

To further increase heat transfer effects, one or more metal heat transfer sheets 58 may be added between the spoiler 56 and 57. When the cold water passing through the annular channel 23 passes through any two closest spoiler 56 and 57, the cold water passes in parallel through two main surfaces of the heat transfer sheets 58, and exchanges heat with the hot wastewater passing through the metal pipe 15 by means of the heat transfer sheets 58 and the metal pipe 15. The metal sheet-like object 56, 57 or 58 significantly increases the heat exchange surface of the cold water; the spoiler 56 and 57 constantly change the flow direction of the cold water to generate turbulence effects; these are all helpful to improve the heat exchange efficiency of the heat exchanger 11.

Figures 33, 34:
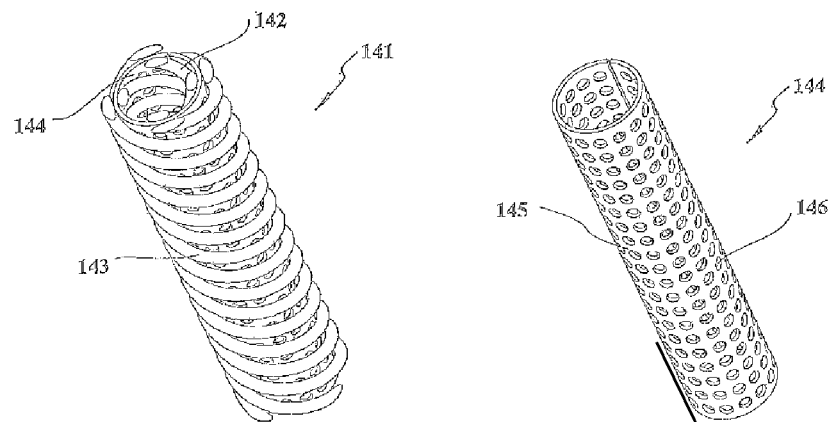
FIG. 33 is a schematic view of a fourteenth embodiment of the baffle according to the present invention.
FIG. 34 is a schematic view of a heat conducting cylinder used in the baffle shown in FIG. 33.
Figure 35:
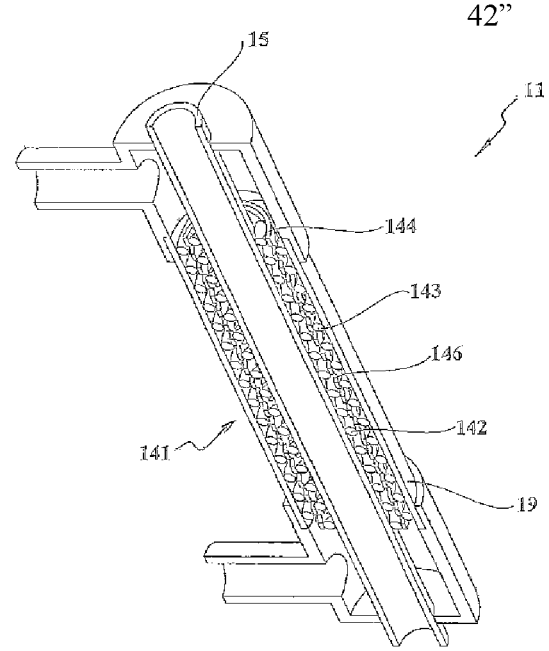
FIG. 35 is a perspective view showing the baffle shown in FIG. 33 installed in the heat exchanger.

FIGS. 33-35 illustrate a structure of a fourteenth embodiment of a thermal conductive baffle according to the present invention. The baffle 141 is similar to the baffle 111 in the tenth embodiment and includes two layers of un-paralleled solid metal wires 142 and 143 overlapping each other to surround the metal pipe 15. The difference merely lies in that a heat conducting cylinder 144 is disposed between the two layers of metal wires 142 and 143 of the baffle 141. A plurality of through holes 146 is formed on cylinder walls 145 of the heat conducting cylinder 144. FIG. 35 illustrates a state in which the baffle 141 is installed in the heat exchanger main body 11. The heat conducting cylinder 144 partitions the cold water annular channel 23 into internal and external annular channels, the solid metal wires 142/143 thereby forming two groups of cold water spiral channels. Part of the cold water spirally passes through the two groups of cold water spiral channels, and part of the cold water passes through the through holes 146 on the heat conducting cylinder 144 between the metal wires, to generate turbulence effects. The baffle 141 significantly increases the heat exchange surface of the cold water, thereby enhancing the heat exchange efficiency of the heat exchanger. In this embodiment, the metal wires 142 and 143 respectively constitute internal and external baffles, and the internal and external baffles may be any one or a combination of any two of the baffles in the first to thirteenth embodiments. Due to the thermal conduction of the heat conducting cylinder 144, the internal and external baffles and the metal pipe 15, the heat exchange surface with the cold water is significantly increased, thereby enhancing the heat exchange efficiency.

In the foregoing embodiments, pipe 15 and the thermal conductive baffles are made of metal, preferably they should be made of good thermal conductors such as copper or aluminum or its alloy to enhance heat exchange. Optionally, cold water conduit 19 can also be made of metal so that its internal wall becomes a heat exchange surface to enhance heat exchange.

In the foregoing embodiments, the thermal conductive baffles are placed in an annular channel formed by 2 tubes (metal pipe 15 & cold water conduit 19) which includes at least one metal wall (metal pipe 14) and is in thermal contact with at least one metal wall (metal pipe 15) that form the annular channel. Fluid (cold water) exchange heat with hot wastewater (second fluid) outside the annular channel. But optionally, other substance, such as electric heating wires, can be placed outside the annular channel, for example, inside metal pipe 15 or outside cold water conduit 19, so that the heat exchanger can serve as a fluid heater. If an electric heating wire is placed outside the cold water conduit, the metal pipe 15 may be replaced by a solid member.

Figure 36:
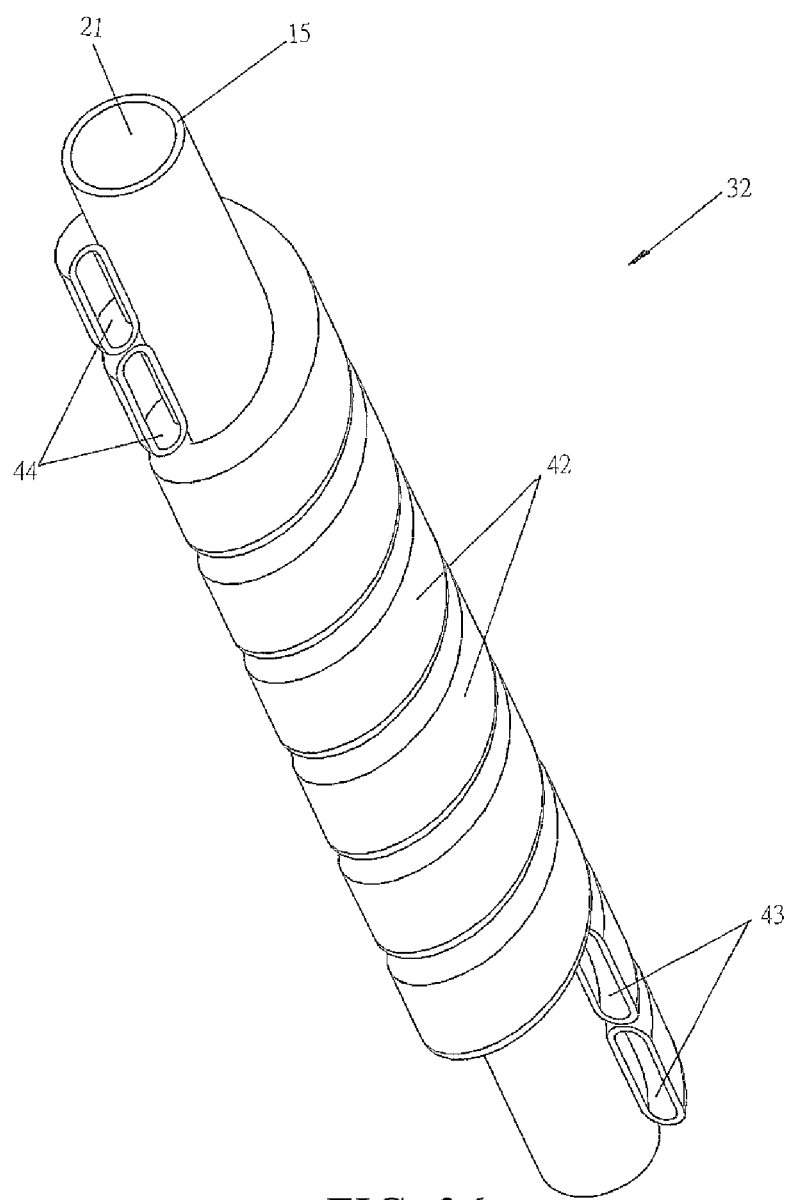
FIG. 36 is a schematic view of a second embodiment of the heat exchanger according to the present invention.

FIG. 36 illustrates a second embodiment of the heat exchanger according to the present invention. The heat exchanger 32 includes a metal pipe 15 and a metal cold water conduit 42 spirally surrounding the metal pipe 15, which tightly nests and thermally contacts the metal pipe 15. A section of the cold water conduit 42 is flat, and a section on an outer wall thereof has at least one straight side and clings to an outer wall of the metal pipe 15 so as to increase a contact surface with the metal pipe 15.

In use of the heat exchanger 32, an inlet 43 (cold water inlet) of the cold water conduit 42 located in the bottom is directly or indirectly connected to a cold water source (not shown) of the building; an outlet 44 (tepid water outlet) on the top thereof is connected to a bathroom heater (not shown) or a bathroom mixing value (not shown). Like the heat exchanger 11 in the first embodiment, the hot wastewater channel 21 of the heat exchanger 32 is communicated to a drain pipe (not shown) of a shower device or the like to receive hot wastewater generated during shower. The hot wastewater passes through the metal pipe 15 in a manner identical to that in the first embodiment, which is not repeated herein.

In the meantime, the cold water is introduced from the cold water inlet 43 to flow through the spiral conduit 42 from the bottom up, and exchanges heat with hot wastewater flowing through the hot wastewater channel 21 by means of the metal pipe 15, so that the temperature of the cold water is changed and the cold water becomes preheated water, and then is exported from the tepid water outlet 44 and provided to the bathroom heater or mixing valve (not shown) for use.

Figure 37:
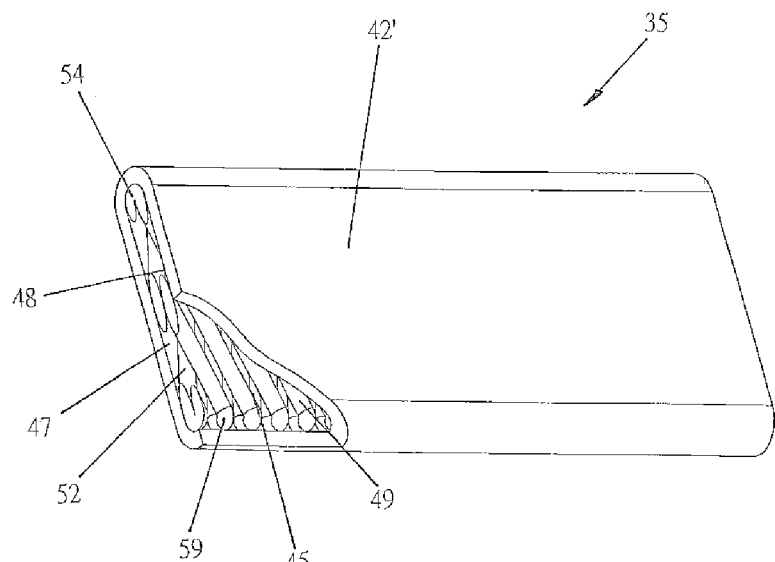
FIG. 37 is a schematic view of a fifteenth embodiment of the baffle according to the present invention.
Figure 38:
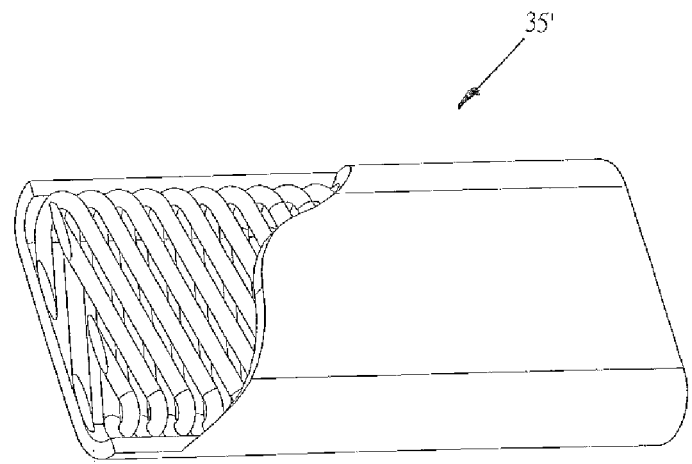
FIG. 38 is a schematic view of a sixteenth embodiment of the baffle according to the present invention.
Figure 39:
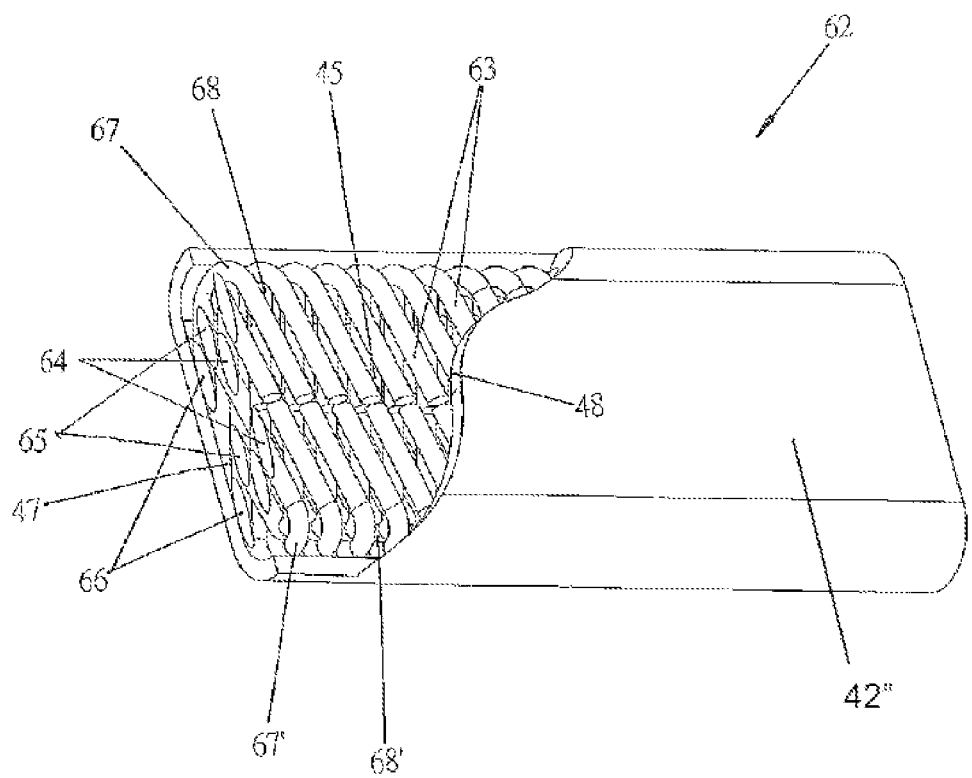
FIG. 39 is a schematic view of a seventeenth embodiment of the baffle according to the present invention.

To increase the heat exchange efficiency, the spiral protruding structure in the first embodiment (FIG. 2) can optionally be added to the wastewater channel 21, the function of which is not repeated herein; meanwhile, a thermal conductive baffle as shown in FIG. 37, 38 or 39 may also be added to the cold water conduit 42.

As shown in FIG. 37, the baffle 35 is placed in a metal fluid conduit 42', a fluid channel 45 formed on an inner wall of the fluid conduit 42' has two parallel surfaces 47 and 48. The baffle is formed by upper and lower layers of metal wires 49 and 52, each layer of metal wires is formed by a plurality of metal wire sections parallel to each other and arranged with gaps, and each layer of metal wires (thermally) contacts the two parallel surfaces 47 and 48 respectively. Part of wire sections in the two layers of metal wires are formed by the same metal wire and are connected through bends 54 and 59. Fluids passing through the fluid channel 45 pass between the two layers of metal wires 49 and 52 and between various sections of parallel metal wires in turbulence, and exchange heat with substances outside the channel 45 (for example, the hot waste water in the metal pipe 15) by means of the two layers of metal wires 49 and 52 and walls of metal channels in thermal contact therewith.

One or more metal fluid conduit 42' having the baffle 35 as shown in FIG. 37 may tightly be wound to the outer wall of the metal pipe 15 to form the heat exchanger 32 (FIG. 38). The baffle 35 in the fluid channel 45 significantly increases the heat exchange surface of the cold water, and constantly changes the flow direction of the cold water, to effectively improve heat exchange effects.

Figure 40:
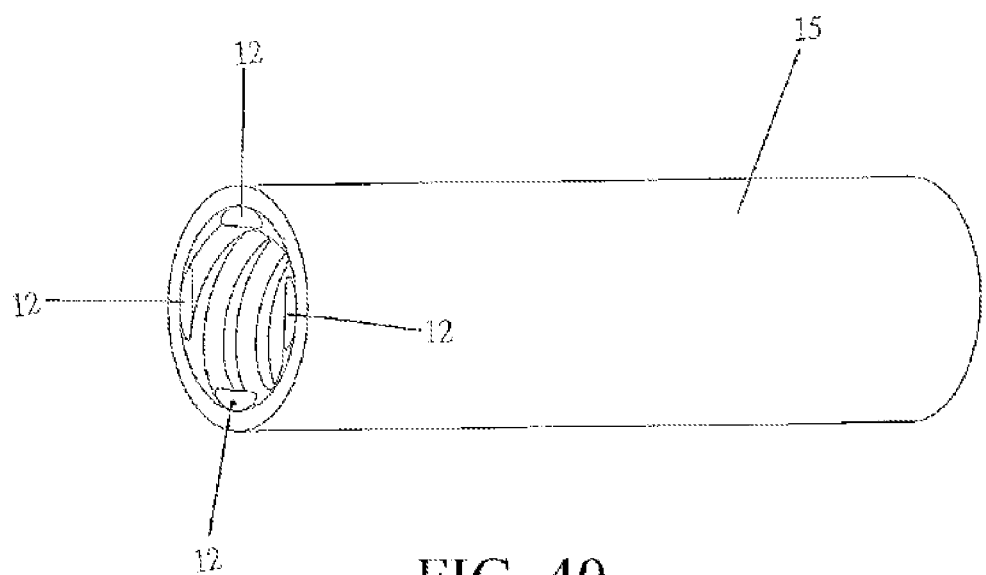
FIG. 40 is a schematic view of a circular fluid pipeline internally provided with a plurality of parallel spiral metal wires clinging thereto which forms the baffle of FIG. 37 or 38 after flattening.

The fluid channel having the heat conducting baffle 35 may be manufactured in the following manner:

a. coiling one or more metal wires on a straight bar with gaps, such that an overall outer diameter thereof slightly less than the inner diameter of a circular metal pipe;

b. placing the straight bar and the metal wires together in a suitable position in the metal pipe;

c. loosening the metal wires, such that the metal wires are naturally rebound to press against the inner wall of the metal pipe;

d. removing the straight bar, to form a circular fluid conduit having a plurality of parallel spiral metal wires clinging thereto as shown in FIG. 40; and e. flattening the circular metal pipe to form the fluid pipeline of the baffle having a thermal conductive baffle as shown in FIG. 37 or 38.

The difference between FIG. 37 and FIG. 38 lies in that: for the baffle 35 shown in FIG. 37, the upper and lower layers of metal wires thereof are tightly pressed together, so that heat can be rapidly transferred from one parallel surface to the other parallel surface through thermal conduction between the two layers of metal wires; and for the baffle 35' (in the sixteenth embodiment) shown in FIG. 38, the upper and lower layers of metal wires thereof leave a gap therebetween, to allow more fluids to pass through and result in smaller pressure loss, and technicians can choose to use the baffle according to situations.

FIG. 39 illustrates a seventeenth embodiment of the baffle according to the present invention. The baffle 62 is disposed in a metal fluid channel 45, and the fluid channel 45 has two parallel surfaces 47 and 48. The baffle is formed by superposition of four layers of metal wires 63, 64, 65 and 66 which are pressed together to provide thermal contact therebetween, each layer of metal wires has a plurality of metal wire sections parallel to each other and having gaps, and metal wire sections in two adjacent layers of metal wires are not parallel to each other. The metal wire 63 in the top layer (thermally) contacts the upper parallel surface 48 of the fluid channel 45; the metal wire 66 in the bottom layer (thermally) contacts the lower parallel surface 47 of the fluid channel 45, and part of sections of the metal wires 63 and 66 in the top layer and the bottom layer are formed by the same metal wire, and are connected through bends 67 and 67'. Part of sections of two layers of metal wires 64 and 65 in the middle are formed by the same metal wire and are connected through bends 68 and 68'. The fluids passing through the fluid channel 45 pass through the four layers of metal wires and the parallel metal wire sections in turbulence, and exchange heat with substances outside the channel (for example, the hot waste water in the metal pipe 15) by means of the metal wires and metal walls of fluid channels in thermal contact therewith.

One or more metal fluid channels 42' having the baffle 62 as shown in FIG. 39 may tightly be wound to the metal pipe 15 to form the heat exchanger 32 (FIG. 36). The baffle 62 significantly increases the heat exchange surface of the cold water, and constantly changes the flow direction of the cold water, which are helpful to improve heat exchange effects.

The fluid channel having the baffle 62 may be manufactured in the following manner:

a. placing the net-like metal cylinder shown in FIG. 22 or 24 into a metal circular pipe whose inner diameter is slightly greater than that of the net-like cylinder; and b. flattening the metal circular pipe and the net-like cylinder together such that the circular pipe form two parallel surfaces and tightly press the (four layers of) metal wires.

Figure 41:
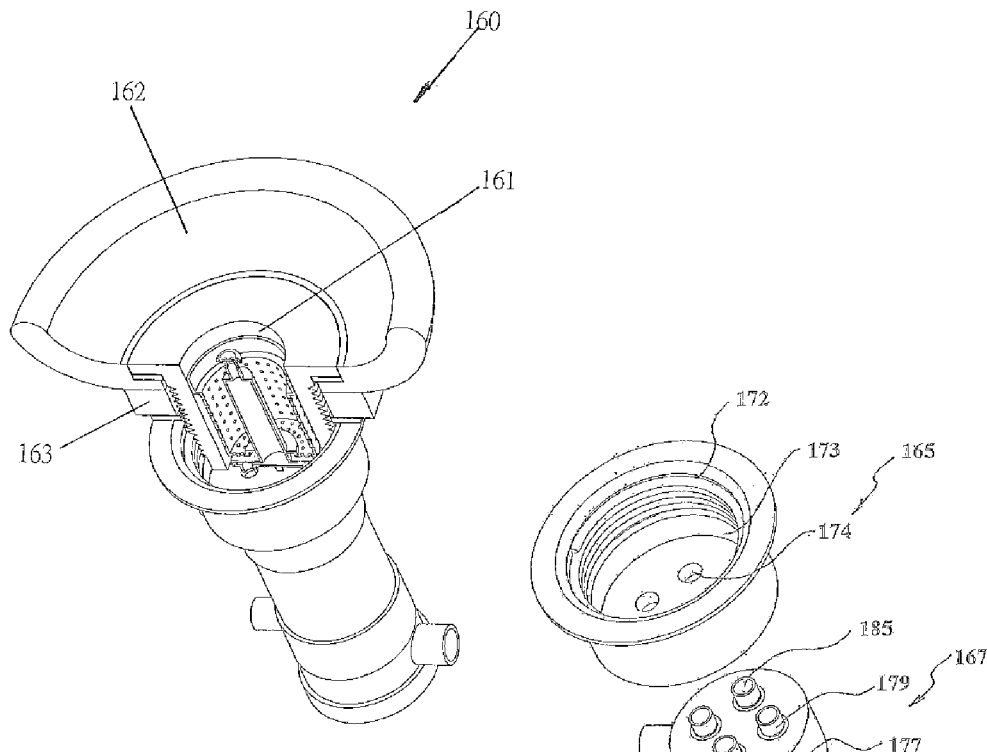
FIG. 41 is a perspective view of a third embodiment of the heat exchanger according to the present invention.
Figure 42:
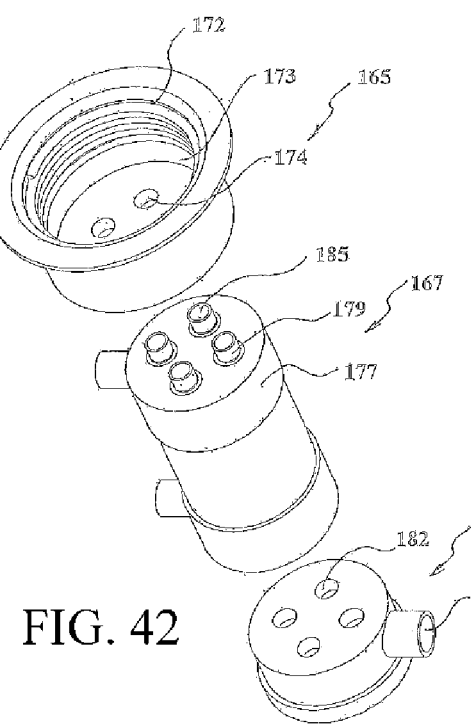
FIG. 42 is an exploded perspective view of the heat exchanger shown in FIG. 41.

FIG. 41 illustrates a third embodiment of the heat exchanger according to the present invention. The heat exchanger 160 is installed below a sink 162 and a tabletop 163. As shown in FIG. 42, the heat exchanger 160 includes a wastewater collector 165, a main body 167 and a wastewater connector 169. The wastewater collector 165 has an opening 172, a cavity 173 and a plurality of wastewater outlets 174. The opening 172 is located above the plurality of wastewater outlets 174 and covers all the wastewater outlets 174 in a horizontal direction. The main body 167 includes a housing 177 and a plurality of heat exchange pipes 179. The wastewater connector 169 has a plurality of wastewater receiving holes 182 and wastewater discharge ports 183. The opening 172 of the wastewater collector 165 communicates with a drain hole 161 of the sink 162, to receive hot wastewater generated during washing. The drain hole 161 covers all the wastewater outlets 174 in a horizontal direction. The hot wastewater flows into the cavity 173 through the opening 172 of the wastewater collector and then flows out of the cavity 173 in parallel from the plurality of wastewater outlets 174. The plurality of wastewater outlets 174 separately communicates with the plurality of heat exchange pipes 179, such that the hot wastewater pass through hot wastewater channels 185 in parallel. The hot wastewater, enters the wastewater connector 169 from the plurality of wastewater receiving holes 182 after passing through the main body 167, and is then discharged from the wastewater discharge ports 183 to a drain pipeline (not shown) outside the building.

Figure 43:
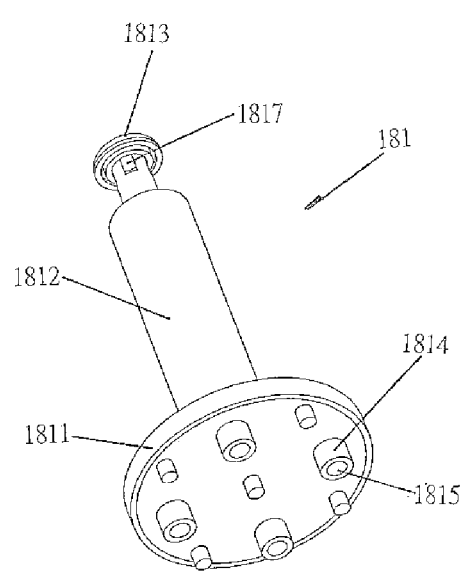
FIGS. 43 and 43A is a perspective view of a flow divider used in the heat exchanger shown in FIG. 41.

To ensure the wastewater flow out from the plurality of wastewater outlets 174 evenly and avoid that the wastewater only rapidly flows out from one or two wastewater outlets to affect the heat exchange efficiency, a flow divider 181 (see FIG. 43) may detachably be disposed in the cavity 173. The flow divider 181 includes a chassis 1811, a riser 1812 extending upwards from the chassis 1811 and an upper cover 1813 covering an upper end of the riser 1812. The chassis 1811 is provided with a plurality of baffles 1814 corresponding to the wastewater outlets 174. The baffles 1814 are adjacent to or placed in inlet ends of the wastewater outlets 174 respectively, so that the wastewater is blocked by the baffles 1814 to pass through gaps 180 (see FIG. 45) between the baffles 1814 and the wastewater outlets 174 with relatively even flow in entering the wastewater channels 185. The quantity of wastewater flow is insufficient to fill the whole wastewater channels 185, and thus the wastewater is attached to inner walls of the wastewater channels 185 and flows downwards around a central air column of the wastewater channels 185.

The baffles 1814 have through holes 1815, which communicate with the riser 1812. An air vent 1817 is formed on the upper end of the riser 1812. The wastewater, when passing through the baffles 1814, forms low pressure in the vicinity of the through holes 1815, to suck air into the wastewater channels 185 from the air vent 1817, so that air can still enter the wastewater channels 185 when the wastewater floods the wastewater outlets 174 to maintain the state of having the central air column.

Figure 43A:
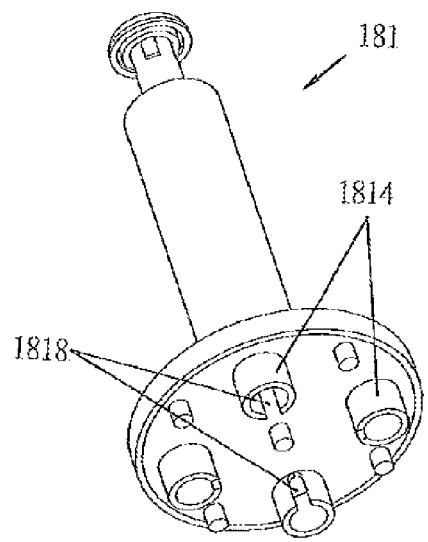

Alternatively, as shown in FIG. 43A, Baffles 1814 of the flow divider 181 may include gaps 1818. When inserted in the wastewater outlet 174 (FIG. 45A) the Baffles 1814 contacts the wastewater outlet 174 and the gap 1818 form passageway 182 for wastewater to evenly flow through.

The downward flowing wastewater exchanges heat with cold water flowing reversely outside the heat exchange pipes through the heat exchange pipes 179.

Figure 44:
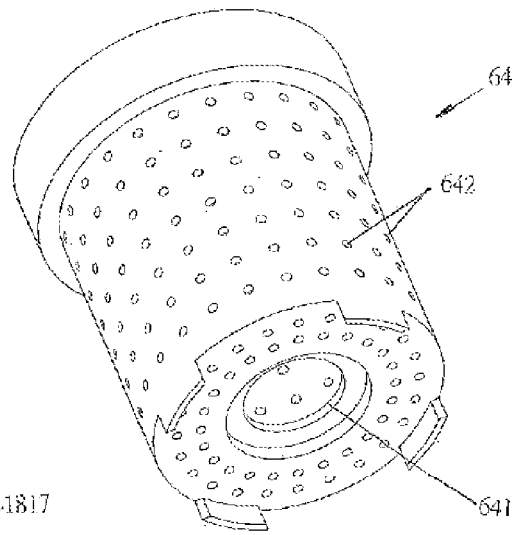
FIG. 44 is a schematic view of a filtration device in the heat exchanger shown in FIG. 41.

To reduce the fouling accumulated and clogged in the wastewater channels 185, a strainer 64 as shown in FIG. 44 may be disposed in the cavity 173 of the wastewater collector 165 for separating hair and other garbage. The strainer 64 has a through hole 641 located in the center to allow the riser 1812 to pass through and small holes 642 located in the periphery to allow the wastewater to pass through. The strainer 64 and the flow divider 181 are detachably installed in the cavity 173 of the wastewater collector 165 such that a user may remove the strainer 64 and the flow divider 181 at the opening 172 for cleaning.

Figure 45:
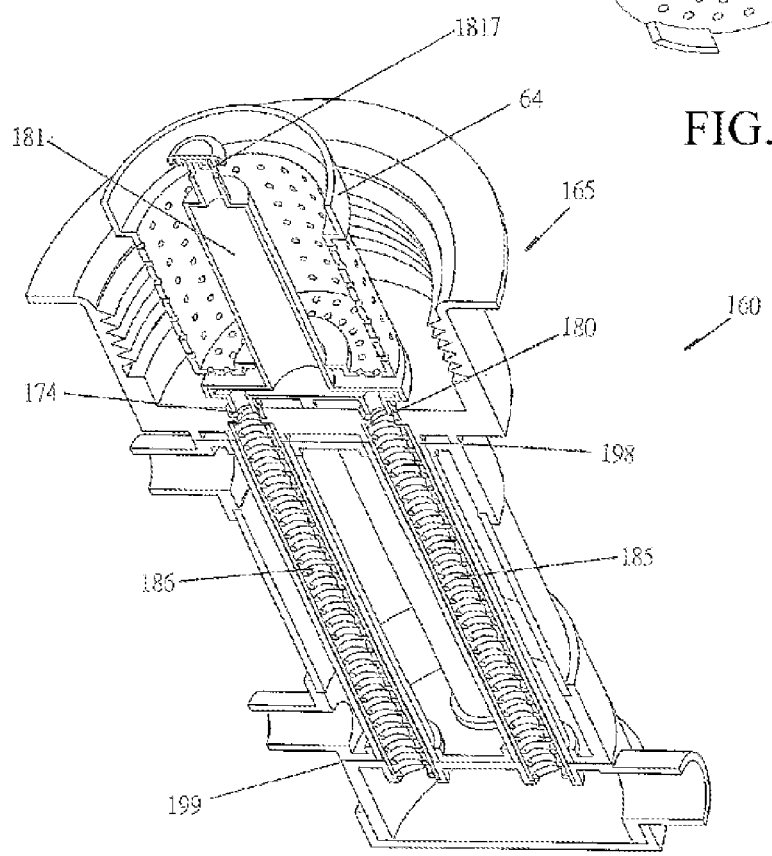
FIGS. 45 and 45A is a sectional perspective view of the heat exchanger shown in FIG. 41.
Figure 45A:
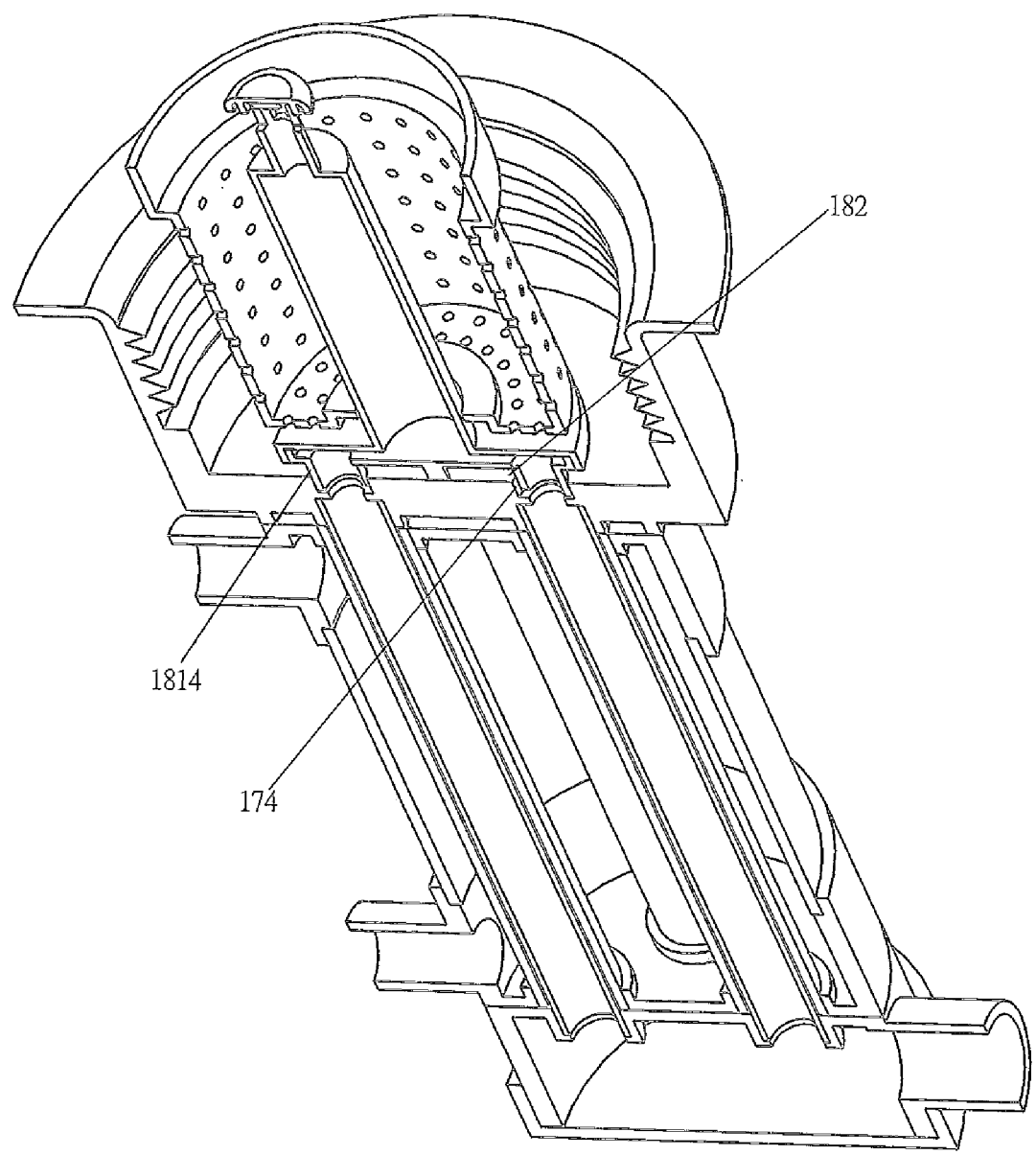

As shown in FIG. 45, a protruding baffle structure 186 can be formed on the inner walls of the wastewater channels 185 to improve the heat exchange efficiency, where the function, effect, and assembly method are substantially the same as those of the baffle structure 22 shown in FIG. 3, and thus are not repeated herein. Similarly, the baffle structure is optional, and such baffle structure may be omitted in the following drawings and description for the sake of simplicity.

Figure 46:
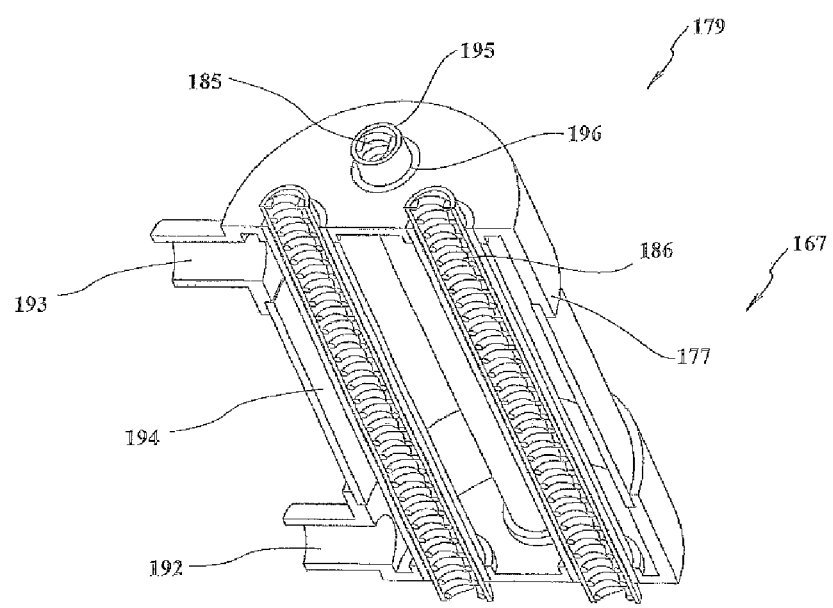
FIG. 46 is a sectional perspective view of the main body of the heat exchanger shown in FIG. 41.

FIG. 46 illustrates an internal structure of the heat exchanger 160. The housing 177 has a cold water inlet 192 and a tepid water outlet 193. The plurality of heat exchange pipes 179 communicates with the plurality of wastewater outlets 174 and the plurality of wastewater receiving holes 182 respectively, such that the hot wastewater pass through from the hot wastewater channels 185 in parallel. The hot wastewater enters the wastewater connector 169 after passing through the main body 167. During operation, the cold water inlet 192 is directly or indirectly connected to a cold water source (not shown) of the building, and the tepid water outlet 193 is connected to a heater (not shown) outside the sink 162 or mixing valve (not shown). Hot wastewater generated during washing flows downwards in parallel in the plurality of hot wastewater channels 185. Meanwhile, the cold water is introduced into a cavity 194 of the housing 177 from the cold water inlet 192 and flows through outer walls of the plurality of heat exchange pipes 179 from the bottom up, and is then exported from the tepid water outlet 193. In the meantime, the cold water exchanges heat with the hot wastewater flowing through the hot wastewater channels 185 of the heat exchange pipes 179, and is heated up as preheated water to reduce energy consumption.

Figures 47, 48:
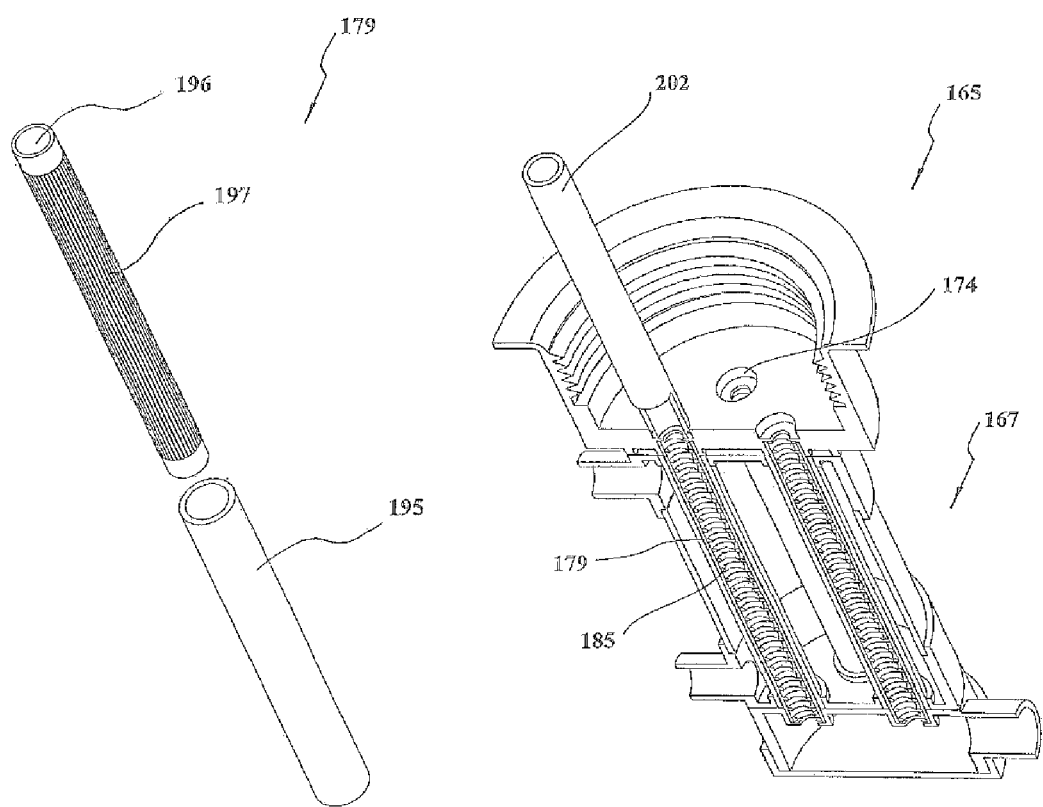
FIG. 47 is an exploded perspective view of a nested structure of a heat exchange pipe.
FIG. 48 is a sectional perspective view of a heat exchanger identical to that of FIG. 45, illustrating an operation of removing fouling of the heat exchange pipe.

As shown in FIG. 47, the heat exchange pipes 179 are formed by mutual nesting of two metal pipes, i.e., an external metal pipe 195 and an internal metal pipe 196, the external metal pipe 195 and the internal metal pipe 196 maintain good thermal contact therebetween, and leave a micro-channel 197 for the wastewater or cold water to pass through. The micro-channel 197 is formed between the external metal pipe 195 and the internal metal pipe 196 by having small concave-convex structures on a surface of the internal metal pipe 196 through knurling or the like. Under normal conditions, no cold water or wastewater seeps out of the micro-channel 197 between the external metal pipe 195 and the internal metal pipe 196. However, when one of the external metal pipe 195 and the internal metal pipe 196 is damaged to cause seepage of cold water or hot wastewater, the cold water or hot wastewater may flow out of the heat exchanger main body 167 through the micro-channel 197, for example, flowing out of a gap 198 between the main body 167 and the wastewater collector 165 or a gap 199 (FIG. 45) between the main body 167 and the wastewater connector 169, to send an alarm. Certainly, the nested structure is optional, and the metal pipe 179 may be illustrated and described in the form of a single piece in the following drawings and description for the sake of simplicity.

After operating for a period of time, it is inevitable that fouling is accumulated on the inner walls of the wastewater channels 185 and the baffle structure 186, which affects efficiency of heat recovery. As the opening 172 and the drain hole 161 are located above the plurality of wastewater outlets 174 and cover all the wastewater outlets 174 in a horizontal direction, as shown in FIG. 48, the user can wash away the fouling only by using a straight pipe 202 to insert one end thereof into the wastewater channels 185 through the wastewater outlets 174 of the wastewater collector 165, and connecting pressurized water from the other end of the straight pipe 202 (for example, the other end is directly communicated to the cold water source of the building).

Figure 49:
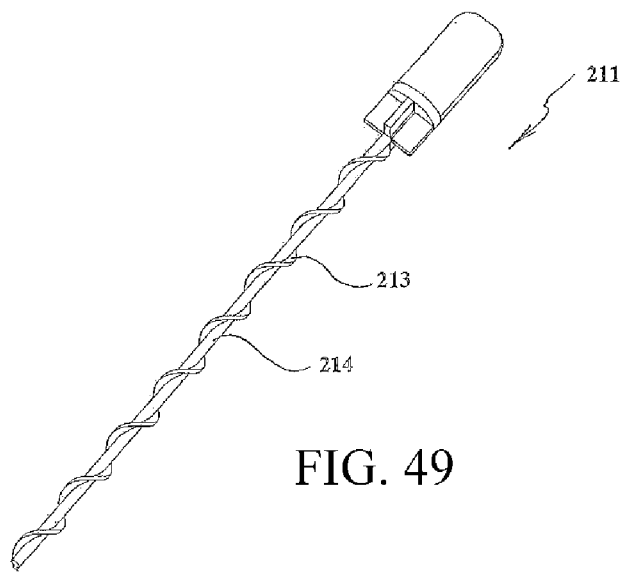
FIG. 49 is a perspective view of a baffle forming the second embodiment of the flow divider according to the present invention.
Figure 50:
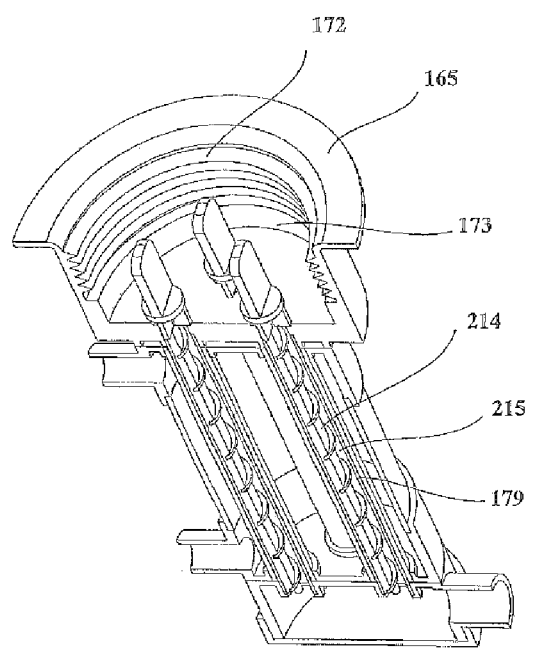
FIG. 50 is a perspective view showing the baffle shown in FIG. 49 installed in the heat exchanger.

FIG. 49 illustrates a structure of baffles in a second embodiment of the flow divider according to the present invention. FIG. 50 illustrates a state in which the baffles are installed in each heat exchange pipe separately. Baffles 211 include strips 214 of which surfaces forming a spiral diversion structure 213 and leave gaps 215 (see FIG. 50) between the baffles and the heat exchange pipes 179. When hot wastewater flows through the hot wastewater channels 185, part of the hot wastewater vertically passes through the gaps 215, and the other part blocked by the spiral diversion structure 213 spirally passes through the hot wastewater channels 185, and the two water flows interfere with each other such that the hot wastewater is fully mixed and effectively exchange heat with cold water flowing reversely outside the heat exchange pipes 179.

A filtration device (not shown) can be disposed in the cavity 173 of the wastewater collector 165 to reduce clogging. After operating for a period of time, it is inevitable that fouling is accumulated on the inner walls of the wastewater channels 185, and thus affecting water drainage and heat recovery efficiency. The user only needs to remove the filtration device and the baffles 211 from the opening 172 of the wastewater collector 165 for cleaning.

Figure 51:
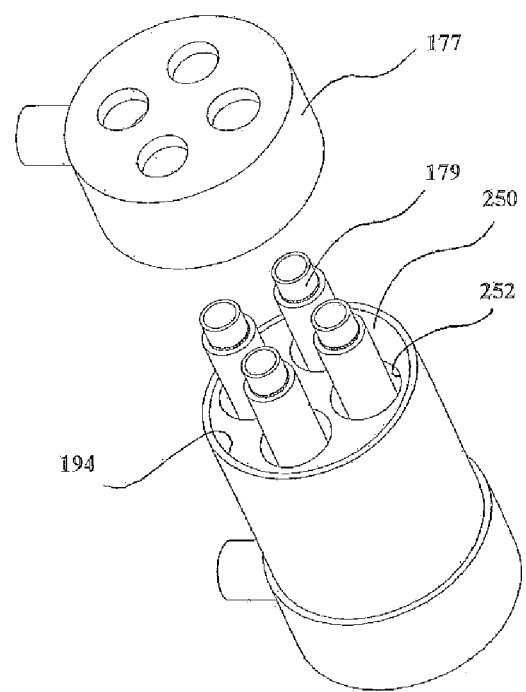
FIG. 51 is a perspective view of a situation where the main body of the heat exchanger shown in FIG. 42 is disposed with an annular channel.

As shown in FIG. 51, to further improve the heat exchange efficiency of the fluid heat exchanger 160 according to the present invention, a flow diverter 250 with a plurality of through holes 252 is disposed in the cavity 194 of the housing 177, and a plurality of annular channels each surrounding each of the heat exchange pipes 179 is formed in the cavity 194 of the housing 177. Various thermal conductive baffle as stated above can be configured in the annular channels.

Figure 52:
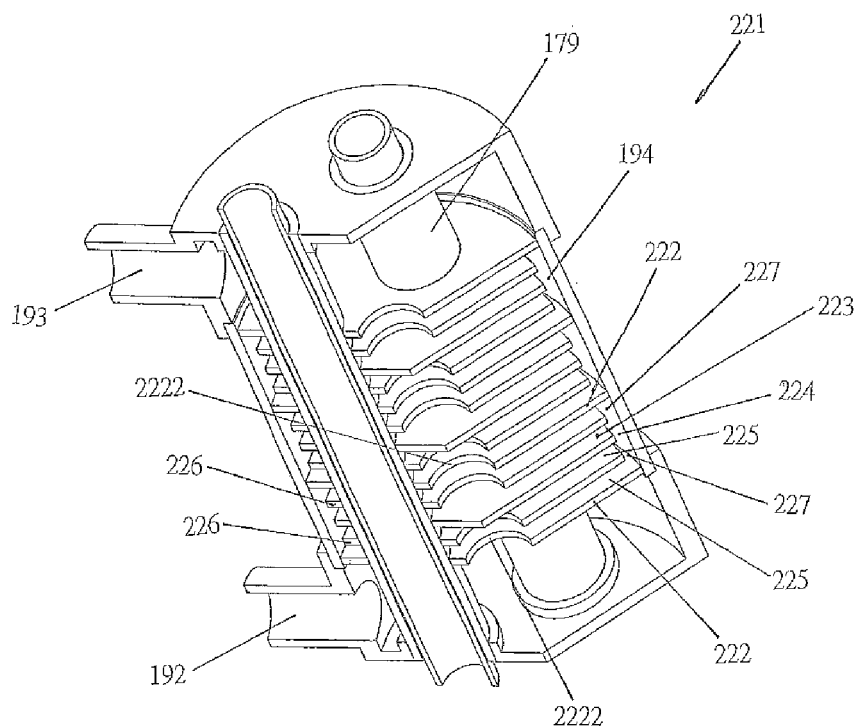
FIG. 52 is a sectional perspective view of an eighteenth embodiment of the baffle according to the present invention.
Figure 53:
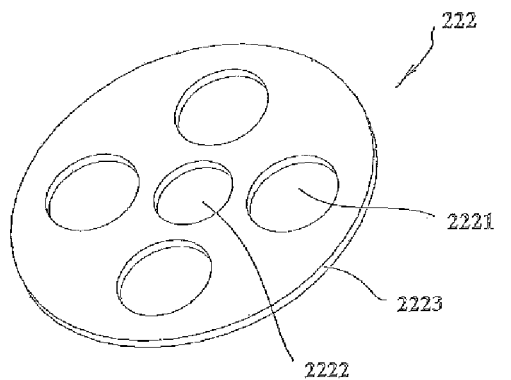
FIGS. 53-54 are perspective views of a spoiler in the eighteenth embodiment of the baffle according to the present invention.
Figure 54:
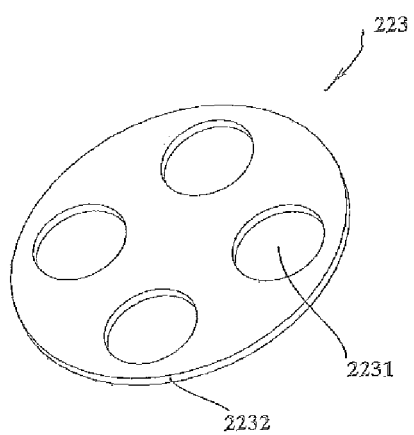

FIG. 52 illustrates an eighteenth embodiment of a thermal conductive baffle according to the present invention. The baffle 221 is formed by a plurality of sheet-like objects 222, 223 and 226 (FIGS. 53, 54 and 55) disposed up and down with gaps. The sheet-like objects 222 and 223 are spoilers, which are alternately disposed horizontally in the cavity 194.

Figure 55:
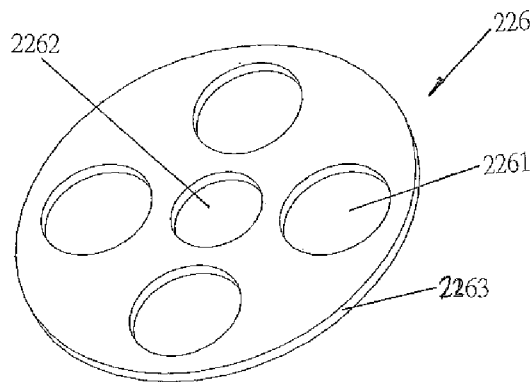
FIG. 55 is a perspective view of a heat transfer sheet in the eighteenth embodiment of the present invention.

The spoiler 222 (FIG. 53) is disc-like, and has a plurality of through holes 2221 corresponding to the heat exchange pipes 179 for nesting the heat exchange pipes 179 and forms a central opening 2222 for cold water to flow through, wherein edge 2223 clings to an inner wall of the cavity 194. The spoiler 223 (FIG. 54) is also disc-like, and also has a plurality of through holes 2231 corresponding to the heat exchange pipes 179 for nesting the heat exchange pipes 179, and an edge 2232 and the inner wall of the cavity 194 leave a gap therebetween to form an opening 224 on the periphery for the cold water to pass through. A gap 225 is formed between any two closest spoilers 222 and 223, and the openings 2222 and 224 do not overlap each other in the main surface direction of the spoilers 222 or 223. After entering the cavity 194 through the cold water inlet 192, the cold water is blocked by the spoiler 222 to enter the gap 225 between the baffle plates/sheets 222 and 223 from the opening 2222, and then the cold water flows from the center to the periphery, and flows upwards through the spoiler 223 and the opening 224. The cold water is once again blocked by the spoiler 222 in the upper layer to flow from the periphery to the center and flows upwards through the opening 2222 of spoiler 222. The process is repeated until the cold water flows out from the tepid water outlet 193. In the meantime, the cold water circuitously flows through the plurality of heat exchange pipes 179 and exchanges heat with the hot wastewater flowing reversely therein, and the spoilers 222 and 223 constantly change the flow direction of the cold water, to generate turbulence effects, which are helpful to improve the heat exchange efficiency. To further improve the efficiency, one or more heat transfer sheets 226 as shown in FIG. 55 can optionally be added between the spoilers 222 and 223. The heat transfer sheets 226 are made of metal and are disc-like, which have a plurality of through holes 2261 corresponding to the heat exchange pipes 179 for nesting and thermally contacting the heat exchange pipes 179 and form a central opening 2262 for cold water to pass through, and an edge 2263 and the inner wall of the cavity 194 leave a gap therebetween to form an opening 227 at the periphery for cold water to pass through. When passing through the gap 225 between any two closest spoilers 222 and 223, the cold water flows through two main surfaces of the heat transfer sheets 226 in parallel, and exchanges heat with hot wastewater in the pipes by means of the heat transfer sheets 226 and the plurality of heat exchange pipes 179 in good thermal contact therewith. The heat transfer sheets 226 significantly increase the heat exchange surface of the cold water, thereby improving the efficiency of the heat exchanger 165. To further increase the heat exchange surface of the cold water, the spoilers 222 and 223 can also optionally be made of metal and thermally contact the plurality of metal pipes 179.

Figure 56:
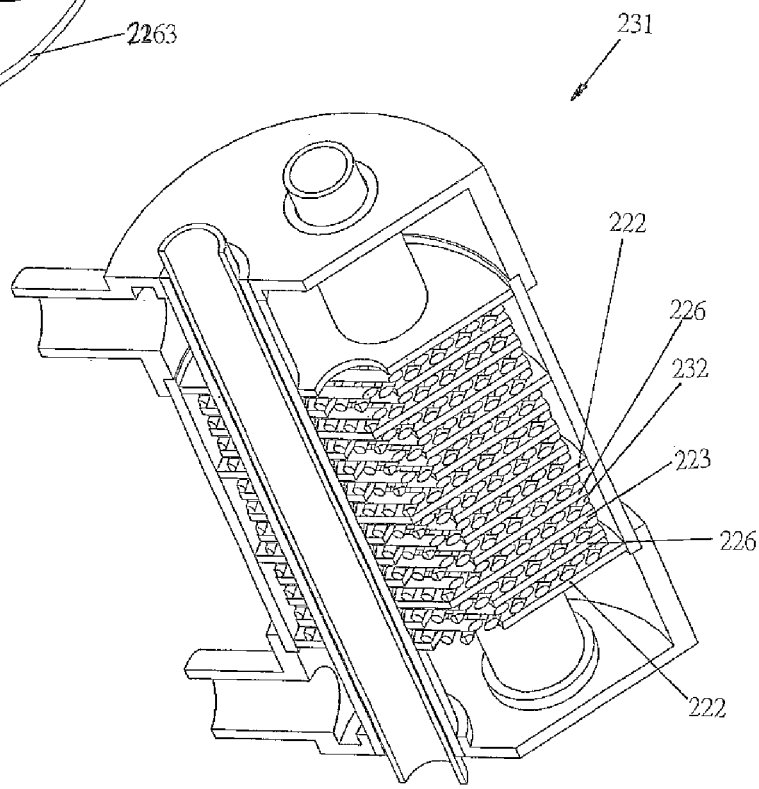
FIG. 56 is a sectional perspective view of a nineteenth embodiment of the baffle according to the present invention.
Figure 57:
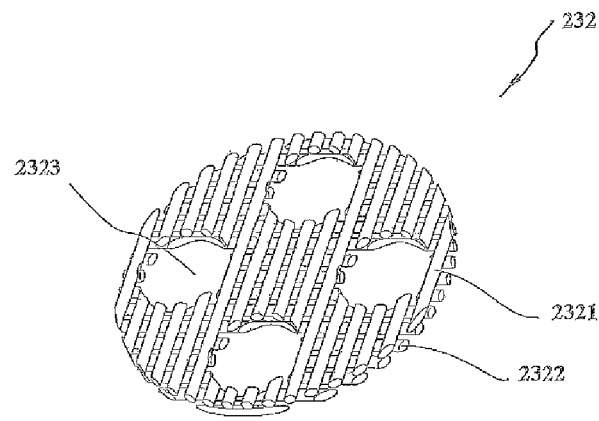
FIG. 57 is a perspective view of a spoiler in the nineteenth embodiment of the baffle according to the present invention.
Figure 58:
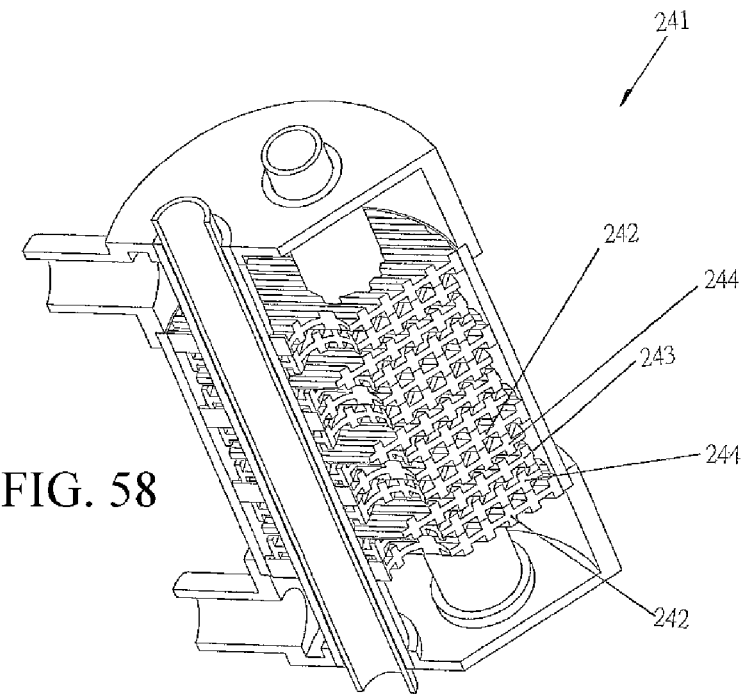
FIG. 58 is a sectional perspective view of a twentieth embodiment of the baffle according to the present invention.
Figure 59:
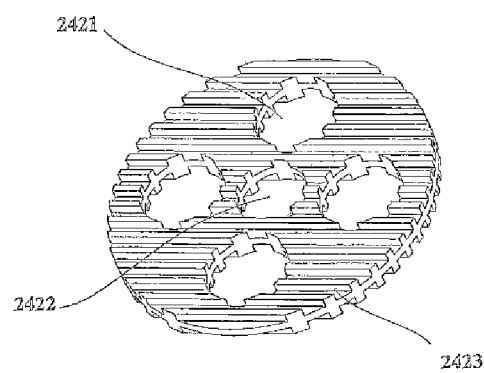
FIGS. 59-60 are perspective views of a spoiler in the twentieth embodiment of the baffle according to the present invention.
Figure 60:
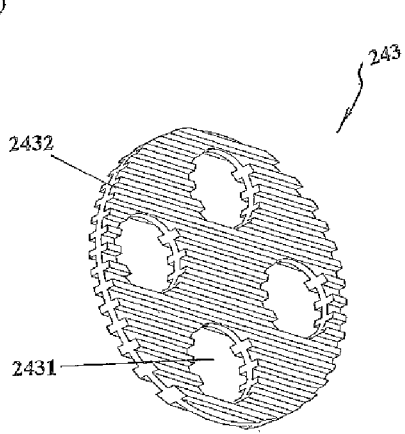
Figure 61:
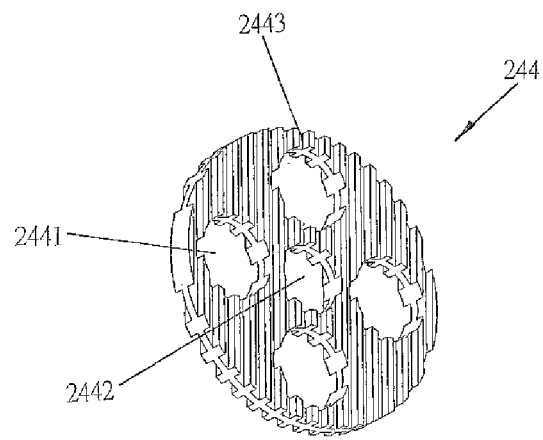
FIG. 61 is a perspective view of a heat transfer sheet in the twentieth embodiment of the baffle according to the present invention.

FIGS. 56-57 illustrate a structure of a nineteenth embodiment of a thermal conductive baffle according to the present invention. The baffle 231 is similar to the baffle 221 in the eighteenth embodiment, and their difference merely lies in that a net-like flow restrictor 232 is disposed between two adjacent parallel sheet-like objects 222, 223 or 226 of the baffle 231, where the net-like flow restrictor 232 is also disc-like and is made by blanking a metal mesh as shown in FIG. 25 The net-like flow restrictor 232 has a plurality of through holes 2323 corresponding to the heat exchange pipes 179 for nesting and thermally contacting the heat exchange pipes 179. The manner in which the cold water passes through the baffle 231 is substantially the same as that in which the cold water passes through the baffle 221, but if the cold water encounters the net-like flow restrictor 232 when passing through a fluid channel formed by two adjacent parallel sheet-like objects 222, 223 or 226 and the plurality of heat exchange pipes 179, the cold water may flow through gaps between the metal wires 2321 and 2322. Thus, the heat exchange surface of the cold water can be increased and further generate turbulence effects, which are helpful to improve the heat exchange efficiency.

FIGS. 58-61 illustrate a structure of a twentieth embodiment of a thermal conductive baffle according to the present invention. The baffle 241 is similar to the baffle 221 in the fifteenth embodiment, and their difference merely lies in that a plurality of parallel grooves 2423, 2432 and 2443 are disposed on upper and lower surfaces of sheet-like objects 242, 243 and 244 of the baffle 241 respectively. Similarly, the spoiler 242 includes a plurality of through holes 2421 corresponding to the heat exchange pipes 179 for nesting and thermally contacting the heat exchange pipes 179 and a central opening 2422; the spoiler 243 also has a plurality of through holes 2431 corresponding to the heat exchange pipes 179 for nesting the heat exchange pipes 179; the heat transfer sheet 224 includes a plurality of through holes 2441 corresponding to the heat exchange pipes 179 for nesting and thermally contacting the heat exchange pipes 179 and also a central opening 2442. The groove 2243 of the heat transfer sheet 224 increases the heat exchange surface of the cold water, and the grooves of the baffle sheet like objects 242, 243 and 244 constantly change the flow direction of the cold water, to further generate turbulence effects, which are helpful to improve the heat exchange efficiency. To further increase the heat exchange efficiency, the spoliers 242 and 243 can optionally be made of metal and thermally contact the plurality of heat exchange pipes 179.

Figure 62:
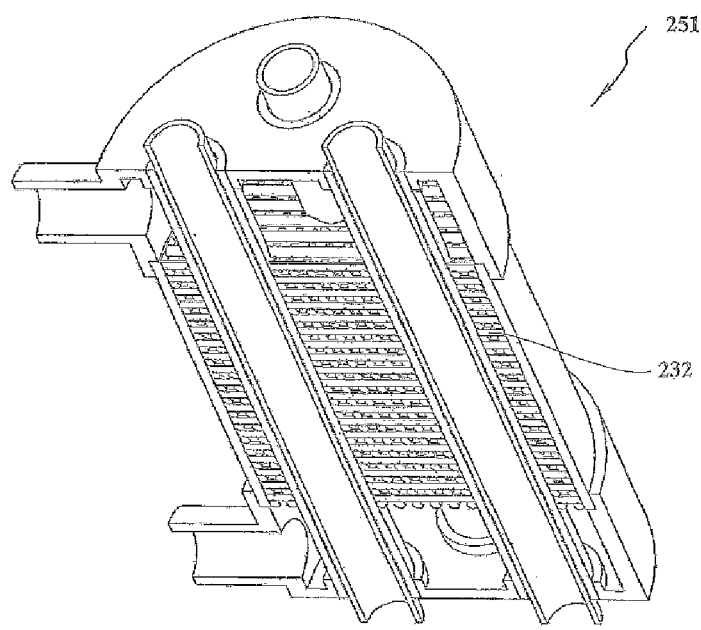
FIG. 62 is a sectional perspective view of a twenty-first embodiment of the baffle according to the present invention.
Figure 63:
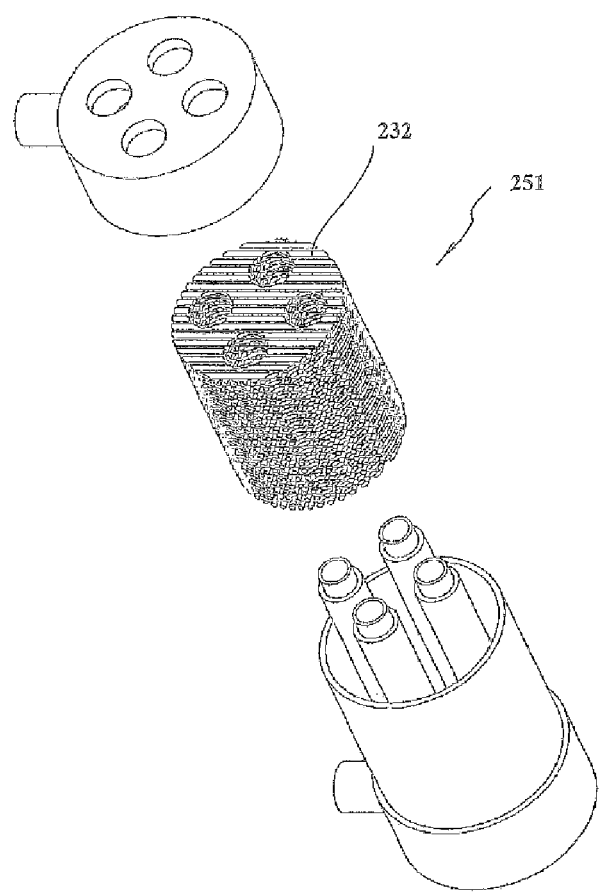
FIG. 63 is an exploded perspective view of the twenty-first embodiment of the baffle according to the present invention.

FIGS. 62-63 illustrate a structure of a twenty-first embodiment of a thermal conductive baffle according to the present invention. The baffle 251 is formed by superposition of a plurality of net-like flow restrictor 232. The specific structure of the net-like flow restrictor 232 has been described previously, which is not repeated herein.

Figure 64:
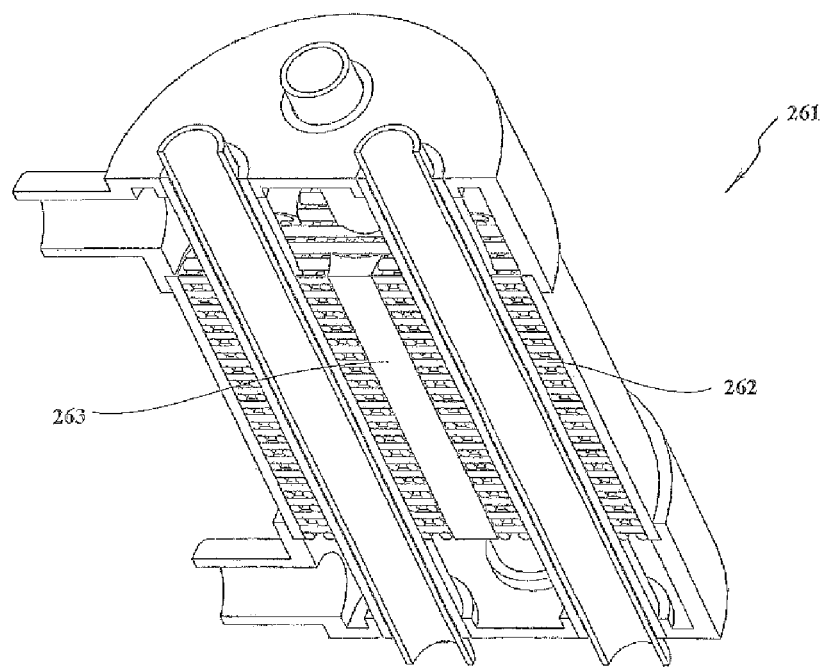
FIG. 64 is a sectional perspective view of a twenty-second embodiment of the baffle according to the present invention.
Figure 65:
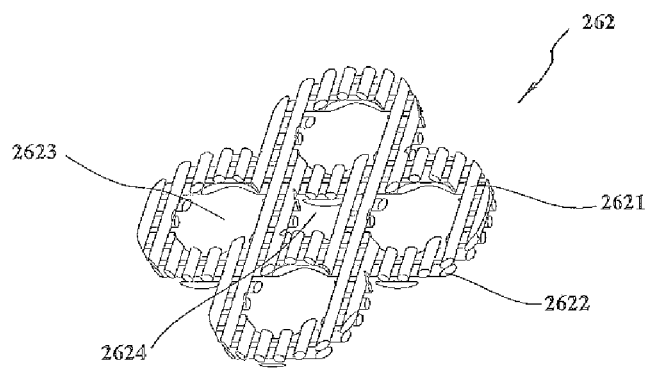
FIG. 65 is a perspective view of a spoiler in the twenty-second embodiment of the baffle according to the present invention.
Figure 66:
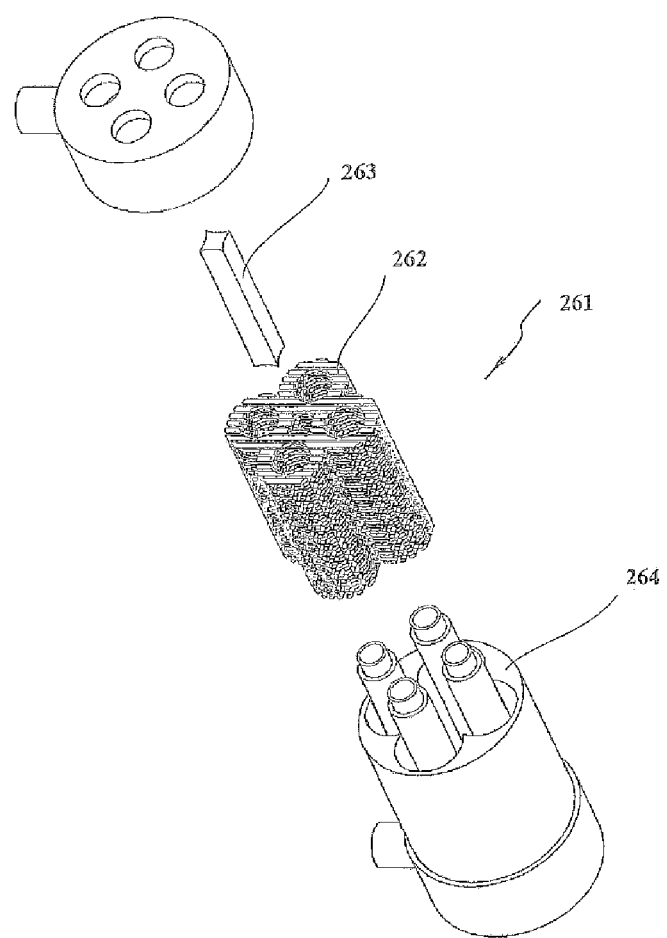
FIG. 66 is an exploded perspective view of the twenty-second embodiment of the baffle according to the present invention.

FIGS. 64-66 illustrate a structure of a twenty-second embodiment of the thermal conductive baffle according to the present invention. The baffle 261 is formed by superposition of a plurality of net-like flow restrictor 262. The net-like flow restrictor 262 is made by blanking a metal mesh as shown in FIG. 25. The net-like flow restrictor 262 have a plurality of through holes 2623 corresponding to the heat exchange pipes 179 for nesting and thermally contacting the heat exchange pipes 179. The net-like flow restrictor 262 are constructed to form rings having substantially the same width with the through holes 2623 as centers, and further form a central hole 2624 in the center of the net-like flow restrictor 262. Correspondingly, shapes coupled to the rings are formed on the inner wall 264 of the cavity 194, such that the baffle 261 clings to the inner wall of the cavity when being assembled into the cavity 194. In addition, a center rod 263 can be inserted into the central hole 2624 of the baffle 261 to prevent the cold water from flowing through the central hole. Distances between portion of the baffle 261 for the cold water to flow through and the heat exchange pipe are substantially uniform thus avoid the situation where heat exchange of the cold water in different portion of the baffle 261 is non-uniform.

Figure 67:
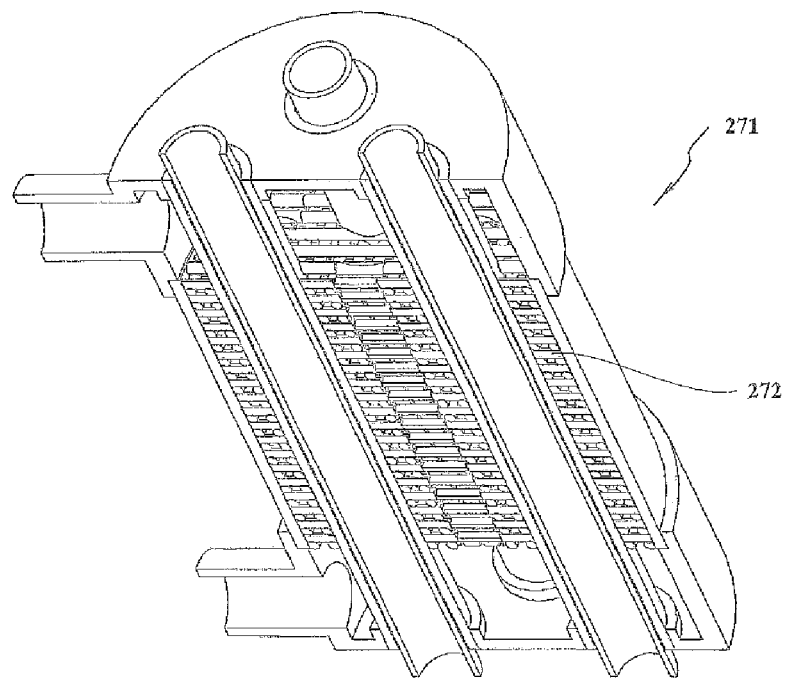
FIG. 67 is a sectional perspective view of a twenty-third embodiment of the baffle according to the present invention.
Figure 68:
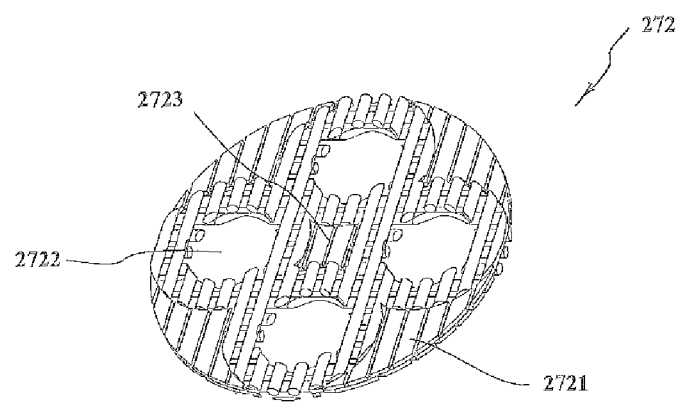
FIG. 68 is a perspective view of a spoiler in the twenty-third embodiment of the present invention.

FIGS. 67-68 illustrate a structure of a twenty-third embodiment of the baffle having a thermal conductive baffle according to the present invention. The baffle 271 is formed by superposition of a plurality of net-like spoilers 272, where the structure of the net-like spoilers 272 is basically similar to that of the net-like spoilers 232 in the seventeenth embodiment, and their difference merely lies in that, in the net-like spoilers 272, metal wires in other peripheral parts 2721 and a central part 2723 are flattened except the rings having substantially the same width center to the through holes 2722 to close meshes and prevent the cold water from flowing there through. Therefore, distances between parts of the baffle 271 for the cold water to flow through and the heat exchange pipe are substantially uniform, and thus avoid the situation where heat exchange of the cold water in different parts of the baffle 271 is non-uniform.

Figure 69:
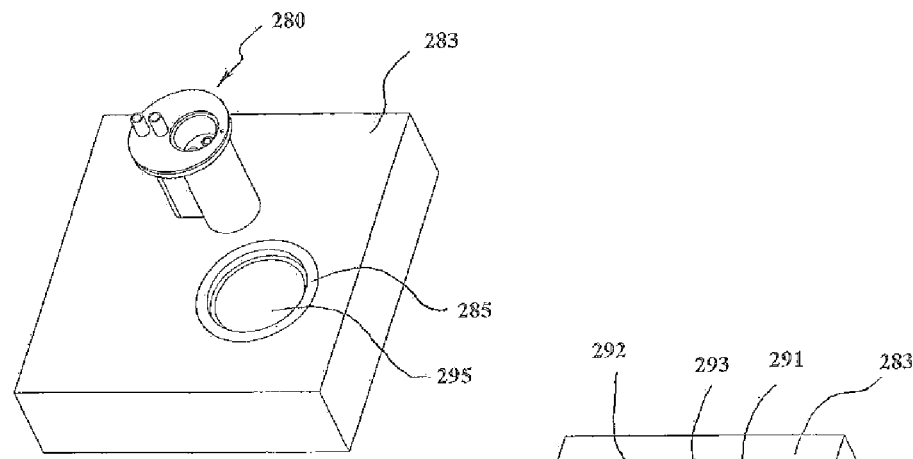
FIG. 69 is an exploded perspective view of a fourth embodiment of the heat exchanger according to the present invention and a bathroom drain device.
Figure 70:
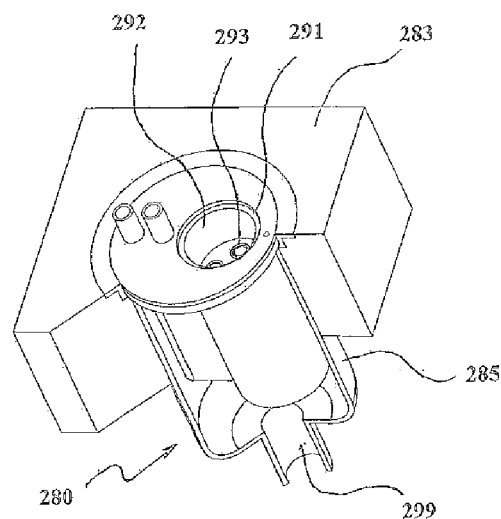
FIG. 70 is a perspective view of an assembling state of the heat exchanger and the bathroom drain device shown in FIG. 69.
Figure 71:
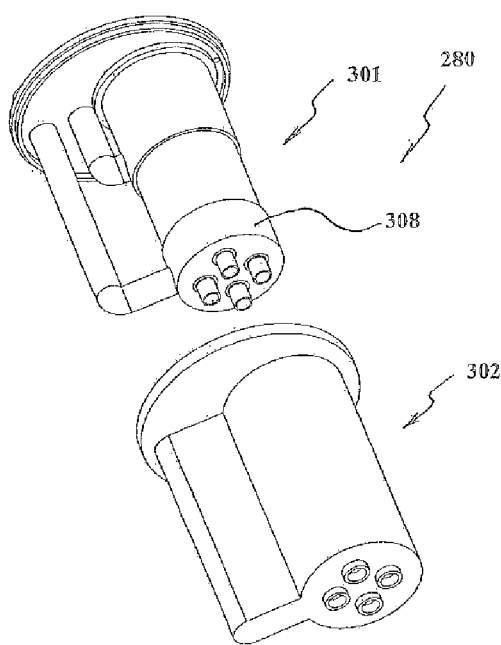
FIG. 71 is an exploded perspective view of the heat exchanger shown in FIG. 69.

FIGS. 69-71 illustrate a fourth embodiment of the heat exchanger according to the present invention. The heat exchanger 280 is detachably disposed in a drain hole 295 of a bathroom floor drain device 283. The heat exchanger 280 has a wastewater collector opening 291, a wastewater collector cavity 292 and a plurality of wastewater collector outlets 293. Hot wastewater generated after shower enters the wastewater collector opening 291 and flows into the wastewater collector cavity 292 from the drain hole 295, then passes through the heat exchanger 280 in parallel in a plurality of wastewater channels 298 formed in a plurality of heat exchange pipes 296, and is further discharged to a drain pipe (not shown) of the building through a drain port 299 of the drain device 283.

FIGS. 70-72 illustrate an assembly structure of the heat exchanger 280. The heat exchanger 280 includes a main body 301 and a leakproof shell 302. As shown in FIG. 72, cold water is introduced from a cold water inlet 303, passes through a cavity 304, and then is exported from a tepid water outlet 305. In the meantime, the cold water exchanges heat with hot wastewater passing through the wastewater channels 298 through the plurality of heat exchange pipes 296. Any one of the foregoing thermal conductive baffle can be disposed in the cavity 304 to increase the heat exchange efficiency.

As shown in FIGS. 73 and 74, the heat exchange pipes 296 are formed by mutual nesting of two metal pipes, i.e., an internal metal pipe 306 and an external metal pipe 307, where a bottom outer wall of the internal metal pipe 306 is in a sealed connection with the leakproof shell 302, and the bottom of an outer wall of the external metal pipe 307 is in a sealed connection with a bottom shell 308 of the main body 301. When there is leakage from the external metal pipe 307, the cold water may flow into a cavity formed between an outer wall of the main body 301 and an inner wall of the leak proof shell 302 through a micro-channel 309 formed between the internal metal pipe 306 and the external metal pipe 307, and then flows out from a leakage alarm hole 310 located above the heat exchange pipes 296 and in adjacent to a wastewater opening 301. The user can notice the leakage in the bathroom and thus notify technicians for repair or replacement.

Figure 75:
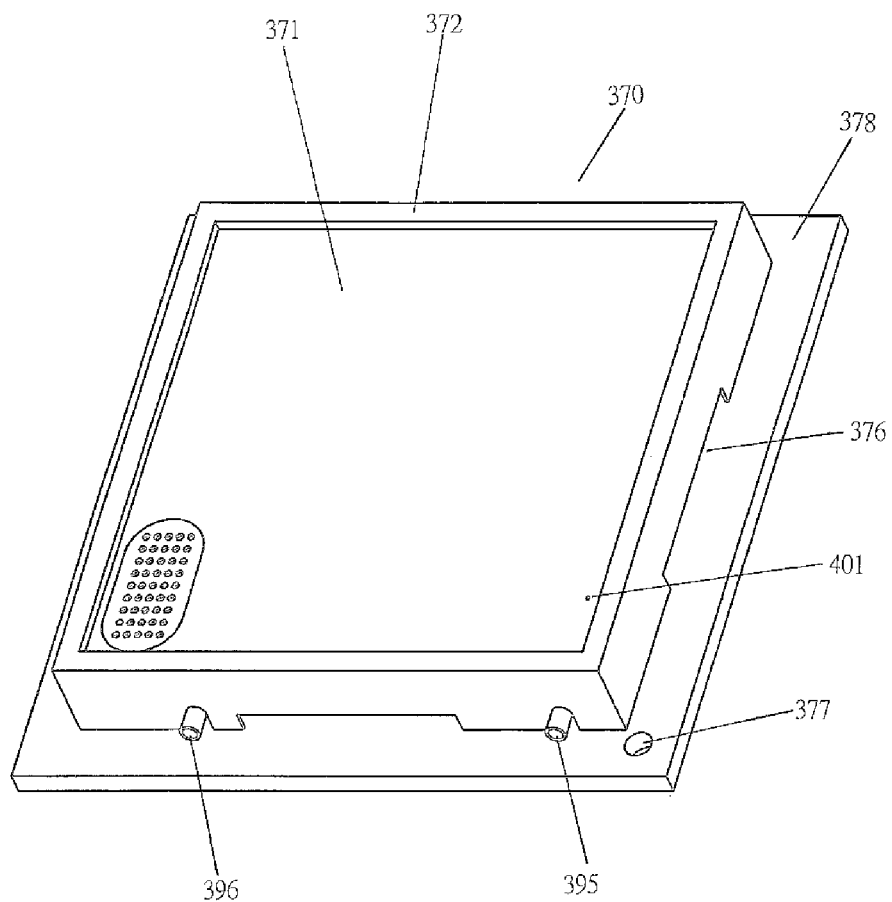
FIG. 75 is a schematic view of a fifth embodiment of the heat exchanger according to the present invention being placed on the bathroom floor.
Figure 76:
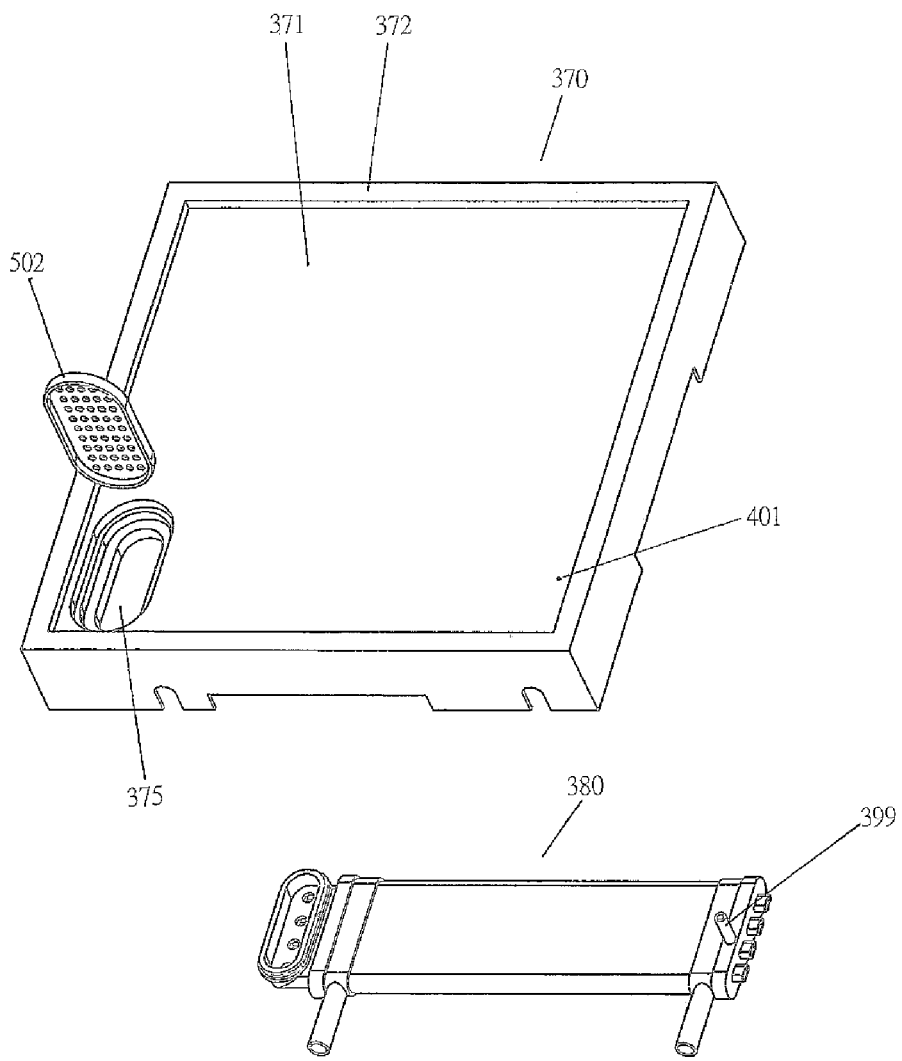
FIG. 76 is an exploded perspective view of the heat exchanger and a water collector shown in FIG. 75.

FIGS. 75-76 illustrate a fifth embodiment of the heat exchanger according to the present invention. The heat exchanger 380 is installed to the bottom of a water catch 370, and the water catch 370 has a platform 371, a periphery 372 and a water catch outlet 375. The water catch 370 is disposed on a shower room floor 378. During operation, a person taking a shower stands on the platform 371, and hot wastewater generated during shower is collected by the platform 371 and the periphery 372 and flows out from the water catch outlet 375.

Figure 77:
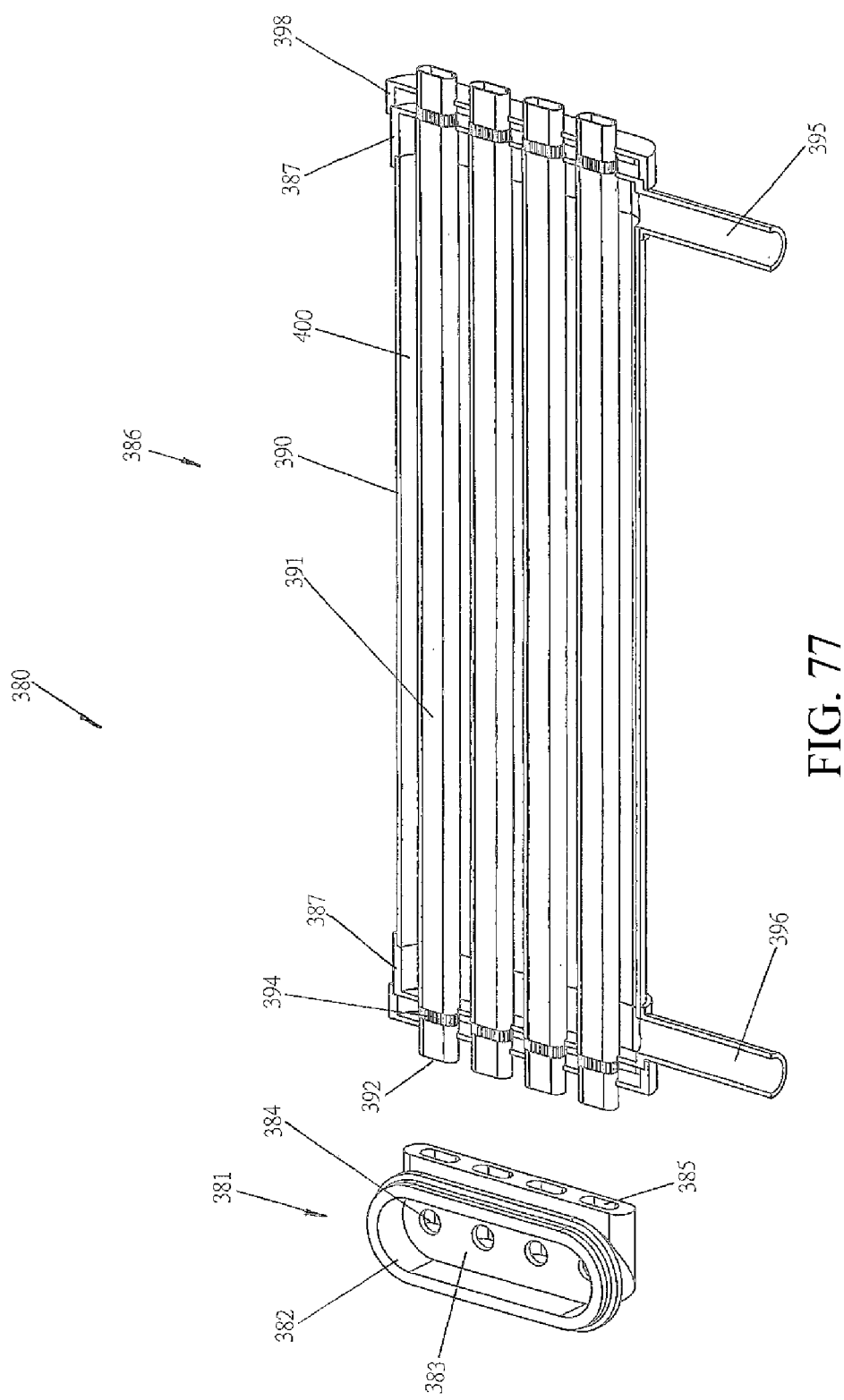
FIG. 77 is an exploded perspective view of the heat exchanger shown in FIG. 75.

FIG. 77 illustrates a structure of the heat exchanger 380, including a wastewater collector 381 and a heat exchanger main body 386. The wastewater collector 381 has an opening 382, a cavity 383 and a plurality of wastewater outlets 384, where the opening 382 is located above the plurality of wastewater outlets 384, and covers all the wastewater outlets 384 in a horizontal direction; the main body 386 includes a housing 387 and a plurality of metal pipes 391, where the housing 387 has a cold water (second fluid) inlet 395, a tepid water (preheated second fluid) outlet 396 and a cold water conduit 390 between the cold water inlet 395 and the tepid water outlet 396; the plurality of metal pipes 391 are disposed in the cold water conduit 390 of which the plurality of metal pipes 391 passes through the housing 387 and forms, in the cold water conduit 390, a plurality of wastewater (first fluid) channels 392 for the hot wastewater to pass through in parallel. The plurality of wastewater channels 392 communicates with the plurality of wastewater outlets 384 of the wastewater collector 381 respectively. Wastewater, after flowing out from the water collector catch 375, enters the cavity 383 through the opening 382 of the wastewater collector 381, then passes through the plurality of wastewater channels 392 in parallel, and finally flows from a gap 376 (FIG. 75) to a bathroom drain port 377 in the bottom of the water catch 370.

In use of the heat exchanger 380, the cold water inlet 395 is directly or indirectly connected to a cold water source (not shown) of the building, and the tepid water outlet 396 is connected to a bathroom heater (not shown) or a mixing valve (not shown).

In the meantime, the cold water is introduced from the cold water inlet 395 to flow through a cold water channel 400 from right to left, and exchanges heat with hot wastewater flowing through the hot wastewater channels 392 by means of the metal pipes 391, such that the temperature of the cold water is changed and the cold water becomes preheated water, and then is exported from the tepid water outlet 396 and provided to the bathroom heater or the mixing valve (not shown) for use.

As shown in FIG. 77, wastewater channels 392 is flat, and has a major axis and a minor axis, where its centerlines are basically arranged horizontally, and the major axis is also arranged horizontally. The vertical height (minor axis) is designed so that wastewater flowing therein is in contact with both its upper and lower surfaces. In one example, when a vertical height (minor axis) of the wastewater channel 392 is less than 6.5 mm, even if the wastewater is flowing at an extremely low flow rate or even is almost stationary, due to resistance of the pipe wall and surface tension of the water, the wastewater passing through may still simultaneously contact two surfaces on the top and in the bottom of the waste water channel 392. This ensures that the hot wastewater still has a sufficient heat exchange surface even if at a low flow rate.

Optionally, the metal pipes 391 as shown in FIG. 77 may be formed by mutual nesting of an internal metal pipe and an external metal pipe as illustrated in the third embodiment (FIG. 48). The internal and external metal pipes maintain good thermal contact therebetween and leave a micro-channel for the cold water to pass through. Under normal conditions, no cold water flows through the micro-channel 394; however, when the external metal pipe is damaged, the cold water may enter the leak proof shell 398 through the micro-channel 394, and flow out from an alarm hole 401 (FIG. 77), located above the metal pipes 391, of the water catch 370 through a connecting pipe 399 (FIG. 76) to alert the user.

After operating for a period of time, it is inevitable that fouling is accumulated on the inner walls of the wastewater channels 392, which affects efficiency of heat recovery. As the opening 382 of the collector covers all the wastewater outlets 384 in a horizontal direction, the user can wash away the fouling by removing a baffle plate 502 and insert straight pipe 202 connecting pressurized water (For example, the other end is directly communicated to the cold water feed of the shower) as shown in the third embodiment (FIG. 9) into the wastewater outlets 384.

Figure 78:
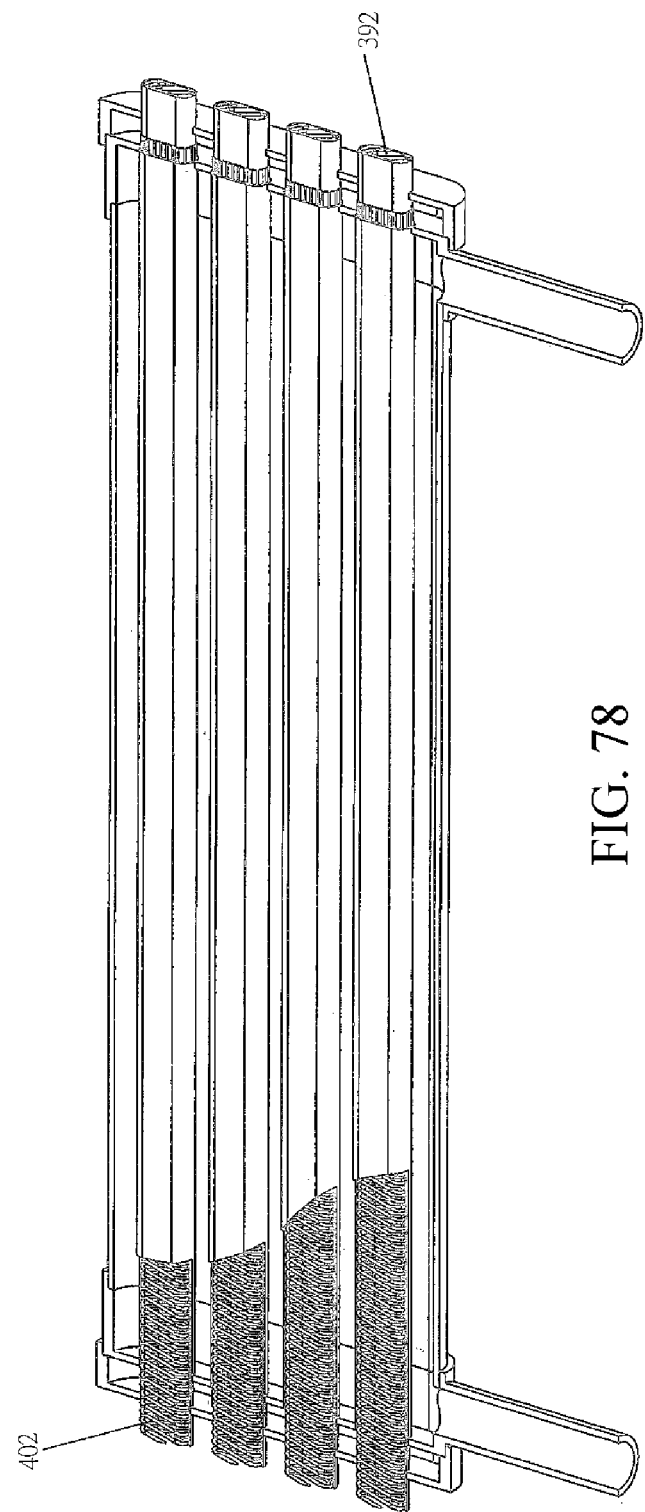
FIG. 78 is a schematic view of an internal baffle structure of a heat exchange pipe in the heat exchanger shown in FIG. 75.

As shown in FIG. 78, a protruding baffle structure 402 may be formed on the inner walls of the wastewater channels 392 to improve the heat exchange efficiency, whereas the function and manufacturing method are substantially the same as those of the baffle structure shown in FIG. 38, and hence are not repeated herein.

To further improve the efficiency of the heat exchanger 386, various described a thermal conductive baffle can be added to the cold water cavity 400, which is not repeated herein.

An energy recovery device of the present invention including various heat exchangers stated above is described below.

The energy recovery device further includes an external temperature-varying apparatus (not shown), where cold clean water (second fluid) after heat exchanged in the heat exchanger is introduced into the external temperature-varying apparatus, such that the temperature of the second fluid is changed to a suitable operating temperature, and the second fluid, after use, serves as hot wastewater (first fluid) introduced into the heat exchanger.

The external temperature-varying apparatus includes a heater or a cooler (not shown). The external temperature-varying apparatus includes a fluid mixer for mixing the cold water (second fluid) after heat exchanged with an external preheated or pre-cooled third fluid to change the temperature.

The heat exchanger can be installed to the bottom of a bathtub or a sink of a washing facility or a base of a shower or is integrally formed with the base of the shower or the sink, to receive hot wastewater generated in shower or washing.

What is claimed is:

1. A heat exchanger comprising:
   a plurality of first fluid tubes through which a first fluid of a first temperature is to flow;
   wherein the first fluid tubes are substantially vertical; and
   wherein the first fluid tubes comprise baffle structures to slow downward motion of the first fluid in the first fluid tubes;
   at least one second fluid tube through which a second fluid of a second temperature is to flow, wherein at least one of the plurality of first fluid tubes extends inside the at least one second fluid tube;
   a first fluid collector for collecting the first fluid and delivering the first fluid to the plurality of first fluid tubes;
   wherein the first fluid collector is in communication with the plurality of first fluid tubes via a plurality of first fluid passages; wherein at least one of the first fluid passages is narrower than at least one of the first fluid tubes so as to restrict the flow rate of the first fluid;
   wherein the heat exchanger is thermally conductive and capable of communicating thermal energy between the first fluid and the second fluid; and
   wherein the heat exchanger comprises a fluid distribution manifold for directing the first fluid received by the first fluid collector to the plurality of first fluid tubes, said fluid distribution manifold comprising an air vent which is in permanent communication with an internal cavity of at least one of the plurality of first fluid tubes.

2. The heat exchanger of claim 1 wherein the first fluid collector comprises a plurality of first fluid outlets each corresponding to a respective first fluid tube, wherein the fluid distribution manifold includes a plurality of baffles which are positioned adjacent to or in the plurality of first fluid outlets and wherein the first fluid passages are formed by gaps between the baffles and the plurality of first fluid outlets or by gaps in the baffles.

3. The heat exchanger according to claim 1 wherein said baffle structures include spiral guiding structures extending along the first fluid tubes to promote spiral motion of the first fluid in the first fluid tubes.

4. The heat exchanger according to claim 3 wherein at least one end of the said spiral guiding structures is covered or forms a slope to reduce accumulation of fouling thereon.

5. The heat exchanger of claim 1 wherein the first fluid passages are formed at least in part by the fluid distribution manifold.

6. The heat exchanger according to claim 1 wherein the first fluid collector comprises a cavity for receiving the first fluid and wherein the fluid distribution manifold is detachably installed in said cavity of the first fluid collector.

7. The heat exchanger according to claim 1 wherein at least one of the plurality of first fluid tubes of the heat exchanger comprises an opening capable of receiving a cleaning tube for directing a fluid stream for displacing deposits formed within the heat exchanger.

8. The heat exchanger according to claim 1 wherein the fluid distribution manifold includes at least one protruding baffle which is located proximate an inlet of at least one of the plurality of first fluid tubes, wherein said at least one protruding baffle includes a through hole which is in communication with said air vent.

9. The heat exchanger according to claim 1 wherein the air vent is in communication with the internal cavity of at least one of the plurality of first fluid tubes via a passage which allows air to be drawn into the internal cavity of the at least one of the plurality of first fluid tubes so as to form an air flow spaced apart from flow of the first fluid in the at least one of the plurality of first fluid tubes.

10. The heat exchanger according to claim 1 wherein the heat exchanger includes an air passage in communication with the air vent, the air passage being configured such that when water flows through the first fluid tubes, air is sucked through the air vent into the first fluid tubes to form a central air column in the first fluid tubes.

11. The heat exchanger according to claim 1 wherein the fluid distribution manifold includes a plurality of protruding baffles which are spaced apart from inlets of the plurality of first fluid tubes, whereby gaps between the protruding baffles and the inlets form said first fluid passages.

12. The heat exchanger according to claim 1 wherein the fluid distribution manifold includes a plurality of protruding baffles which are in contact with inlets of the plurality of first fluid tubes, whereby the first fluid passages are formed by gaps in the protruding baffles.

13. The heat exchanger according to claim 1 wherein the at least one second fluid tube comprises a further baffle for moderating flow of the second fluid and wherein the said further baffle surrounds at least one first fluid tube and wherein the further baffle comprises at least one elongate member, wherein the elongate member comprises a solid elongate core and annular or spiral structures surrounding said core.

14. A heat exchanger including:
   a first fluid collector having an opening for collecting a first fluid and delivering the first fluid to a plurality of first fluid outlets in parallel;
   a housing having a second fluid inlet for receiving a second fluid, a second fluid outlet and a second fluid cavity between the second fluid inlet and the second fluid outlet;

a plurality of metal pipes in the second fluid cavity, the plurality of metal pipes forming a plurality of first fluid channels through the second fluid cavity and the housing for the first fluid to pass through in parallel, wherein the first fluid channels separately communicate with the first fluid outlets of the first fluid collector to receive the first fluid from the first fluid outlets;

wherein the second fluid inlet is configured for introducing a second fluid with a temperature different from that of the first fluid into the heat exchanger so as to transfer heat from the first fluid to the second fluid via the plurality of metal pipes;

wherein the metal pipes extend vertically and each metal pipe includes a baffle structure for slowing downward motion of the first fluid in the metal pipe; and wherein the heat exchanger comprises a fluid distribution manifold for directing the first fluid received by the first fluid collector to the plurality of metal pipes, said fluid distribution manifold comprising an air vent which is in permanent communication with an internal cavity of at least one of the metal pipes.

15. The heat exchanger of claim 14 wherein the heat exchanger is configured to receive the first fluid in the form of a liquid.

16. The heat exchanger of claim 15 wherein the first fluid collector is a waste water collector for collecting waste water.

17. The heat exchanger of claim 15 wherein the first fluid collector is in communication with the plurality of first fluid channels via a plurality of first fluid passages, the first fluid passages and first fluid channels being configured such that when the first fluid is water, the first fluid flowing through the first fluid passages is insufficient to fill the first fluid channels.

18. The heat exchanger of claim 14 wherein the first fluid collector comprises the plurality of first fluid outlets each corresponding to a respective first fluid channel, wherein the fluid distribution manifold includes a plurality of baffles which are positioned adjacent to or in the plurality of first fluid outlets and wherein the first fluid passages are formed by gaps between the baffles and the plurality of first fluid outlets or by gaps in the baffles.

19. The heat exchanger according to claim 14 wherein the at least one second fluid cavity comprises a further baffle for moderating flow of the second fluid and wherein said further baffle surrounds at least one of the plurality of metal pipes and wherein the further baffle comprises at least one elongate member, wherein the elongate member comprises a solid elongate core and annular or spiral structures surrounding said solid core.

* * * * *